(12) United States Patent
Uchino et al.

(10) Patent No.: US 6,813,040 B1
(45) Date of Patent: Nov. 2, 2004

(54) IMAGE PROCESSOR, IMAGE COMBINING METHOD, IMAGE PICKUP APPARATUS, AND COMPUTER-READABLE STORAGE MEDIUM STORING IMAGE COMBINATION PROGRAM

(75) Inventors: Fumiko Uchino, Kyoto (JP); Kenji Masaki, Nagaokakyo (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/393,034

(22) Filed: Sep. 9, 1999

(30) Foreign Application Priority Data

Sep. 10, 1998 (JP) .......................................... 10-257192

(51) Int. Cl.⁷ .............................................. G06F 15/00
(52) U.S. Cl. ........................ 358/1.9; 358/515; 358/518
(58) Field of Search ........................ 358/1.9, 518, 515, 358/516, 520, 523, 527, 538, 537, 1.16; 382/284–295, 317, 318, 167, 164, 165

(56) References Cited

U.S. PATENT DOCUMENTS 4,734,782 A   3/1988  Maeshima ................... 358/280
6,215,914 B1 * 4/2001  Nakamura et al. ........... 382/284
6,243,103 B1 * 6/2001  Takiguchi et al. ........... 345/435
2001/0033701 A1 * 10/2001 Okisu et al. ................. 382/284

FOREIGN PATENT DOCUMENTS

| JP | 2-288667 | 11/1990 |
|----|----------|---------|
| JP | 5-137059 | 6/1993  |
| JP | 6-141246 | 5/1994  |

* cited by examiner

Primary Examiner—Mark Wallerson
(74) Attorney, Agent, or Firm—Sidley Austin Brown & Wood LLP

(57) ABSTRACT

An image processor for combining a plurality of partial color images to produce a single whole image, is provided with: a calculator for calculating a first correction amount for pixel data of a first color image and a second correction amount for pixel data of a second color image in the aspect of at least one color component based on pixel data of at least a boundary portion of each of the first and second color images; a corrector for correcting the pixel data of the first color image and the pixel data of the second color image based on the first and second correction amounts respectively to reduce a color tone difference between the first and second color images; and an image combiner for combining the corrected first color image with the corrected second color image at their respective boundary portions.

6 Claims, 12 Drawing Sheets

IMAGE PROCESSOR, IMAGE COMBINING METHOD, IMAGE PICKUP APPARATUS, AND COMPUTER-READABLE STORAGE MEDIUM STORING IMAGE COMBINATION PROGRAM

This application is based on patent application No. 10-257192 filed in Japan, the contents of which are hereby incorporated by references.

BACKGROUND OF THE INVENTION

This invention relates to an image processor, an image combining method, an image pickup apparatus provided with an image processor, and a computer-readable storage medium storing an image combination program.

Conventionally, in the field of a digital video camera, a digital still camera and like image pickup apparatus using a solid-state image sensor such as a Charge Coupled Device (CCD), there have been known methods for improving a resolution according to which an object image is partially picked up using a plurality of image sensors, and a whole object image is produced by combining partial images in an image processing as disclosed in, for example, Japanese Unexamined Patent Publications No. 5-137059 and No. 6-141246.

Further, U.S. Pat. No. 4,734,782 discloses an image processor in which an image of an original divided into two pieces with an overlapping boundary portion is picked up by two image sensors, and picked images are combined together at the boundary portions to form a whole image, and intermediate tones can be reproduced by area gradation. In this apparatus, a parameter of the area gradation at a joint portion of the two images is made continuous in order to realize a continuous area gradation at the joint portion.

As a technique for uniforming a density difference between a plurality of images continuously picked up and uniforming a density difference among a plurality of images when they are formed on the same sheet, Japanese Unexamined Patent Publication No. 2-288667 discloses a digital image density uniforming method in which an average density of an arbitrary area of an image as a reference and a density of a corresponding area of another image to be subjected to density conversion are calculated, and the density of the image to be subjected to density conversion is corrected based on a difference between the calculated densities.

In the case that a whole object image is obtained by dividing an object into several sections, picking up images of these sections by a plurality of color image sensors, and pasting picked partial images together, a color discontinuity occurs at a joint portion due to a color displacement unless a white balance (WB) adjustment is applied the respective partial images in a matching manner. As a result, the obtained picked image undesirably has an unnatural color tone.

The above-mentioned Japanese Unexamined Patent Publication Nos. 5-137059 and 6-141246 disclose a technique for dividing a whole object into sections and picking up images of these sections by a plurality of image sensors. However, these publications disclose neither the problem of the color discontinuity at the boundary portions of the picked images resulting from the variant WB adjustment applied to the partial images, nor a method for solving this problem.

Further, the image processor disclosed in the above-mentioned U.S. Pat. No. 4,734,782 is designed to prevent an occurrence of a density discontinuity at the joint portion of two monochromatic picked images, but not to prevent an occurrence of a color discontinuity caused by the color displacement of the color images. Neither does this publication disclose a method for solving this problem.

The method disclosed in the above-mentioned Japanese Unexamined Patent Publication No. 2-288667 is designed to correct a density difference between a plurality of monochromatic images. However, this publication neither mentions the aforementioned problem of the color discontinuity in the color image, nor indicates a means for solving this problem.

SUMMARY OF THE INVENTION

It is an object of the invention to provide an image combination technique which has overcome the problems residing in the prior art.

It is another object of the invention to provide an image processor and image combining method which can produce a picked image by combining a plurality of partial images having inconspicuous color discontinuities.

According to an aspect of the invention, a plurality of images are combined. A first correction amount for pixel data of a first color image having a plurality of color components and a second correction amount for pixel data of a second color image having the same color components are calculated in the aspect of at least one of the plurality of color components based on pixel data of at least a boundary portion of each of the first and second color images in the aspect of the at least one color component. The pixel data of the first color image and the pixel data of the second color image are corrected based on the first and second correction amounts respectively to reduce a color tone difference between the first and second color images. The corrected first and second color images are combined with each other at their respective boundary portions.

The first and second correction amounts may be calculated by calculating an average value of pixel data of at least a boundary portion of the first color image and an average value of pixel data of at least a boundary portion of the second color image in the aspect of at least one of the plurality of color components, and calculating a first offset amount for the pixel data of the first color image and a second offset amount for the pixel data of the second color image based on calculated average values in the aspect of the at least one color component. In this case, the first and second color image may be corrected by adding the first offset amount to the pixel data of the first color image and the second offset amount to the pixel data of the second color image to correct the color tone of the first and second color images.

These and other objects, features and advantages of the present invention will become clear from the following description of the preferred embodiments when the same is read in conjunction with the accompanying drawings.

BRIEF DESCRIPTION OF THE DRAWINGS

FIGS. 8A and 8B are graphs showing frequency distribution functions of pixel data when color tones of boundary portions of left and right images are substantially the same, wherein FIG. 8A shows an exemplary frequency distribution function of pixel data of red (R) component and FIG. 8B shows an exemplary frequency distribution function of pixel data of blue (B) component;

FIGS. 9A and 9B are graphs showing frequency distribution functions of pixel data when color tones of boundary portions of left and right images are different, wherein FIG. 9A shows an exemplary frequency distribution function of pixel data of a red component and FIG. 9B shows an exemplary frequency distribution function of pixel data of a blue component;

DETAILED DESCRIPTION OF THE PREFERRED EMBODIMENTS OF THE INVENTION

Figure 1:
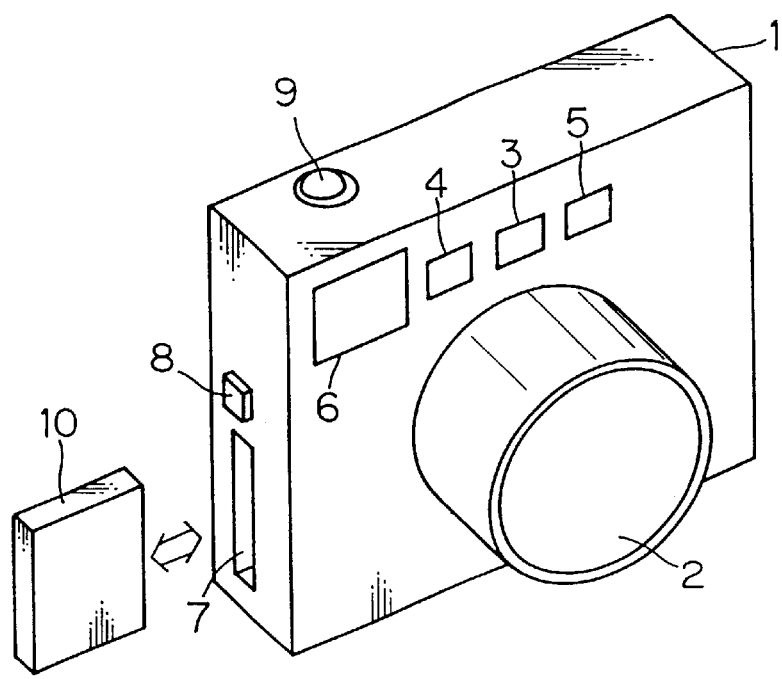
FIG. 1 is a perspective view showing an external construction of an electronic camera provided with an image processor according to an embodiment of the invention.
Figure 2:
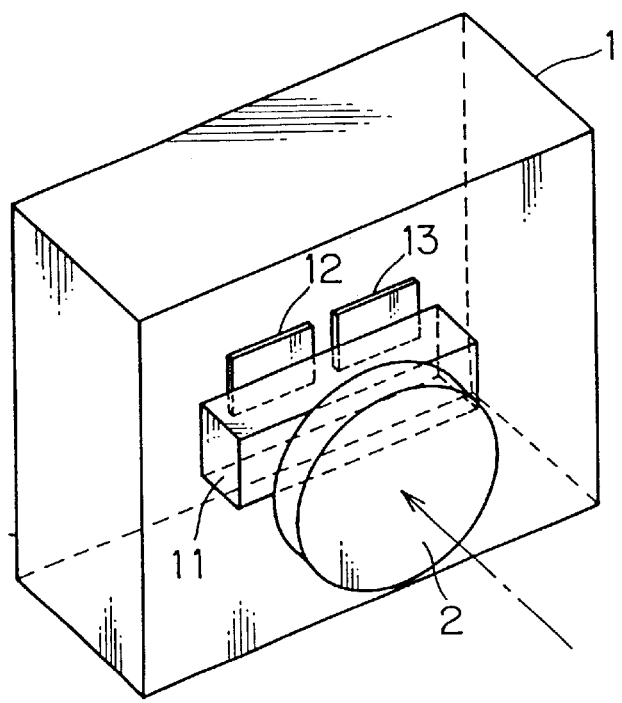
FIG. 2 is a diagram showing a schematic construction of an image sensing optical system provided in the electronic camera.

FIG. 1 is a perspective view showing an external configuration of an electronic camera provided with an image processor according to an embodiment of the invention, and FIG. 2 is a perspective view showing a schematic construction of an image sensing optical system provided in the electronic camera.

In FIGS. 1 and 2, the electronic camera 1 is provided with a taking lens 2 comprised of a zoom lens substantially in the middle of its front surface. A light emitting window 4 and a light receiving window 5 used to measure a distance to an object by the active metering system are arranged above the taking lens 2. A light metering window 3 used to measure a brightness of the object is arranged between the windows 4 and 5, and a viewfinder window 6 is arranged on the left side of the light emitting window 4.

The light emitting window 4 is a window through which infrared rays are projected to the object, and the light receiving window 4 is a window through which the infrared rays reflected by the object are received. Although the active metering system is used as a metering system in this embodiment, the passive metering system may be employed.

A card insertion opening 7 through which a hard disk card 10 (hereinafter, HD card 10) is attached and detached is formed in one side surface of the electronic camera 1, and a card eject button 8 for ejecting the HD card 10 is provided above the card insertion opening 7. A shutter-release button 9 is provided at the left end of the upper surface of the electronic camera 1.

When a photographing result is to be printed out, the HD card 10 is taken out of the electronic camera 1 by pushing the card eject button 8, and is mounted a printer compatible with the HD card 10 for printing.

Alternatively, the electronic camera 1 may be provided with an interface of an SCSI cable and connected with a printer of the electronic camera 1, so that image data can be directly transferred from the electronic camera 1 to the printer, which then prints photographed image.

Further, although the hard disk card in accordance with the PCMCIA standards is used as a storage medium for the image data in this embodiment, a memory card, a mini-disk (MD) or like storage medium may be used provided it can store the photographing result as an image data.

Behind the taking lens 2 of a camera main body is arranged an image sensing optical system including an optic path separator 11 comprised of, e.g., a prism, and color image sensors 12, 13 comprised of a pair of CCD color area sensors.

Figure 3:
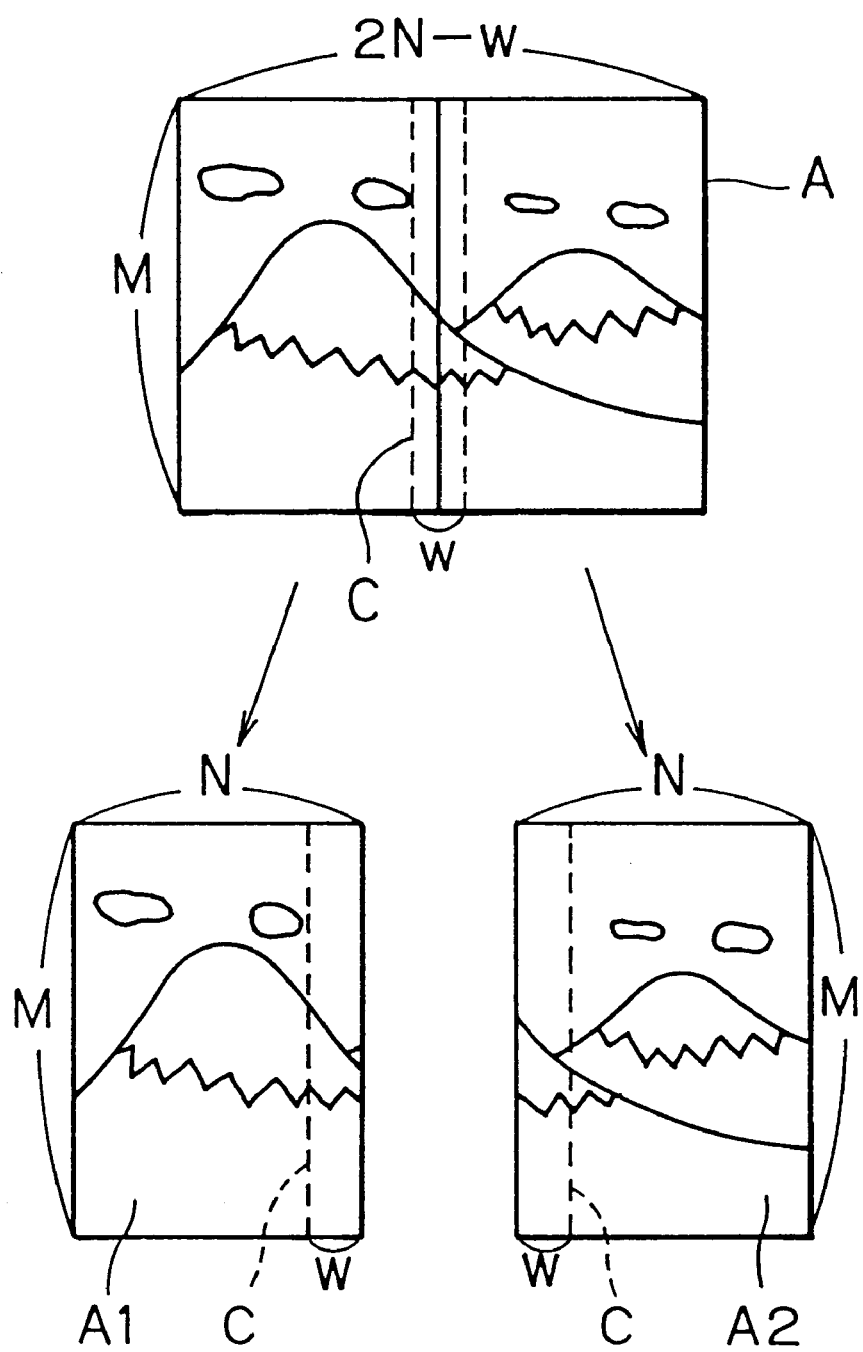
FIG. 3 is a diagram showing a relationship between an whole object light image within a field of view and partial light images of the object light image focused on respective sensing surfaces of color image sensors.

The image sensing optical system has a laterally long rectangular view field as shown in FIG. 3. An object light image A within this view field is horizontally divided into two sections by the optic path separator 11 in such a manner that a boundary portion C is included at the right end of a left half object light image A1 and at the left end of a left half object light image A2. The left half object light image A1 is picked up by the color image sensor 12 (hereinafter, "CCD 12"), whereas the right half object light image A2 is picked up by the color image sensor 13 (hereinafter, "CCD 13"). A picked image corresponding to the object light image A is obtained (i.e., the entire object image within the view field is picked up) by pasting the images of the boundary portions C of the images picked up by the CCDs 12, 13 together.

Figure 4:
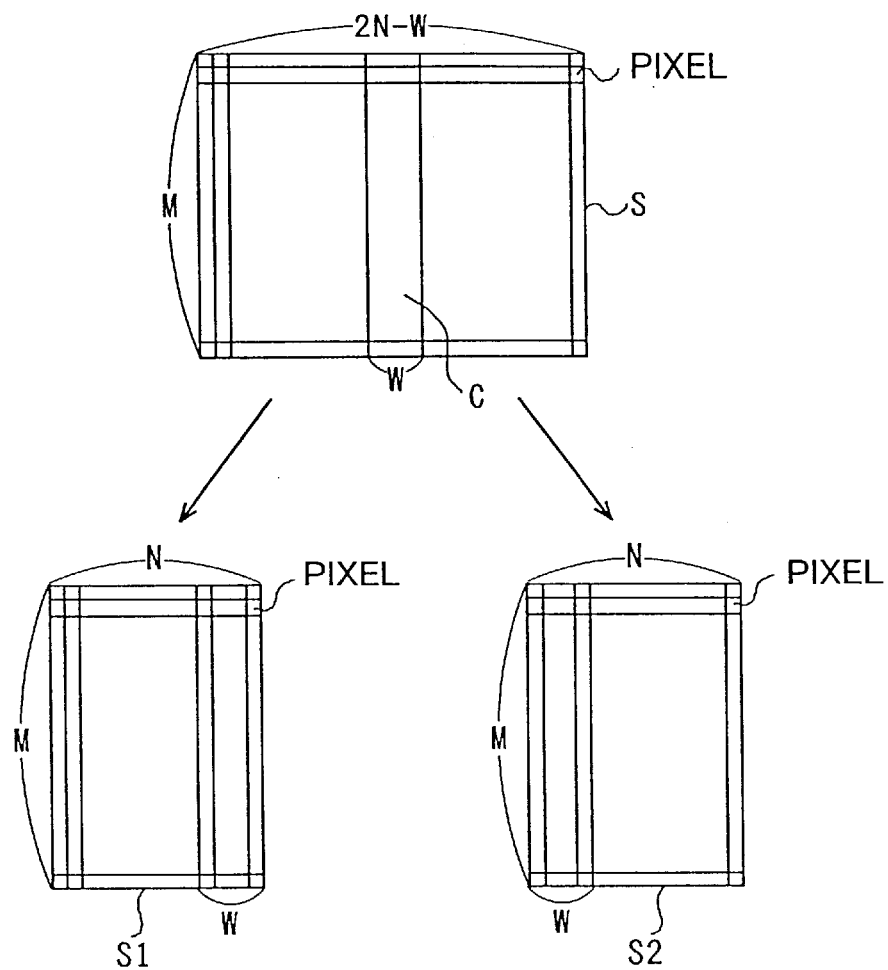
FIG. 4 is a diagram showing a relationship between the number of pixels of the color image sensor and that of pixels bearing the whole object light image.

Accordingly, as shown in FIG. 4, the number of pixels of the respective sensing surfaces S1, S2 of the CCDs 12, 13 is M (vertical)×N (horizontal) if the number of pixels of the sensing surface (laterally long sensing surface) S corresponding to the object light image A is M (vertical)×(2N−W) (horizontal) and the number of pixels of the boundary portion C along horizontal direction is W.

Figure 5:
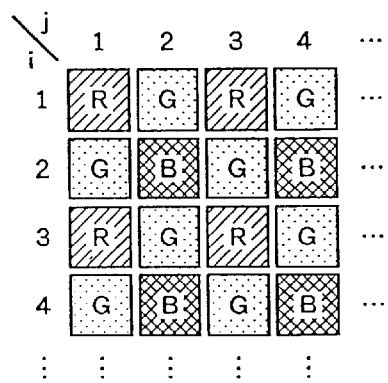
FIG. 5 is a diagram showing an array of color filters of the Bayer system provided on the sensing surface of the color image sensor.

The CCDs 12, 13 are single-plate color CCDs of the Bayer system, and color filters of R, G, B are arrayed in the respective pixel positions of the sensing surfaces as shown in FIG. 5. In the color array of FIG. 5, R (red), B (blue) and G(green) are arrayed in a checkerwise manner. If (i, j) (where i=1, 2, . . . M, and j=1, 2, . . . N) denotes the pixel position, green filters are arranged at the intersections of odd rows and even columns ($2\zeta+1$, $2\xi+2$) and at the intersections of even rows and odd columns ($2\zeta+2$, $2\xi+1$) (where $\zeta=0, 1, 2, \ldots M/2$, $\xi=0, 1, 2 \ldots N/2$); red filters are arranged at the intersections of odd rows and odd columns (2ζ+1, 2ξ+1); and blue filters are arranged at the intersections of even rows and even columns (2ζ+2, 2ξ+2).

Figure 6:
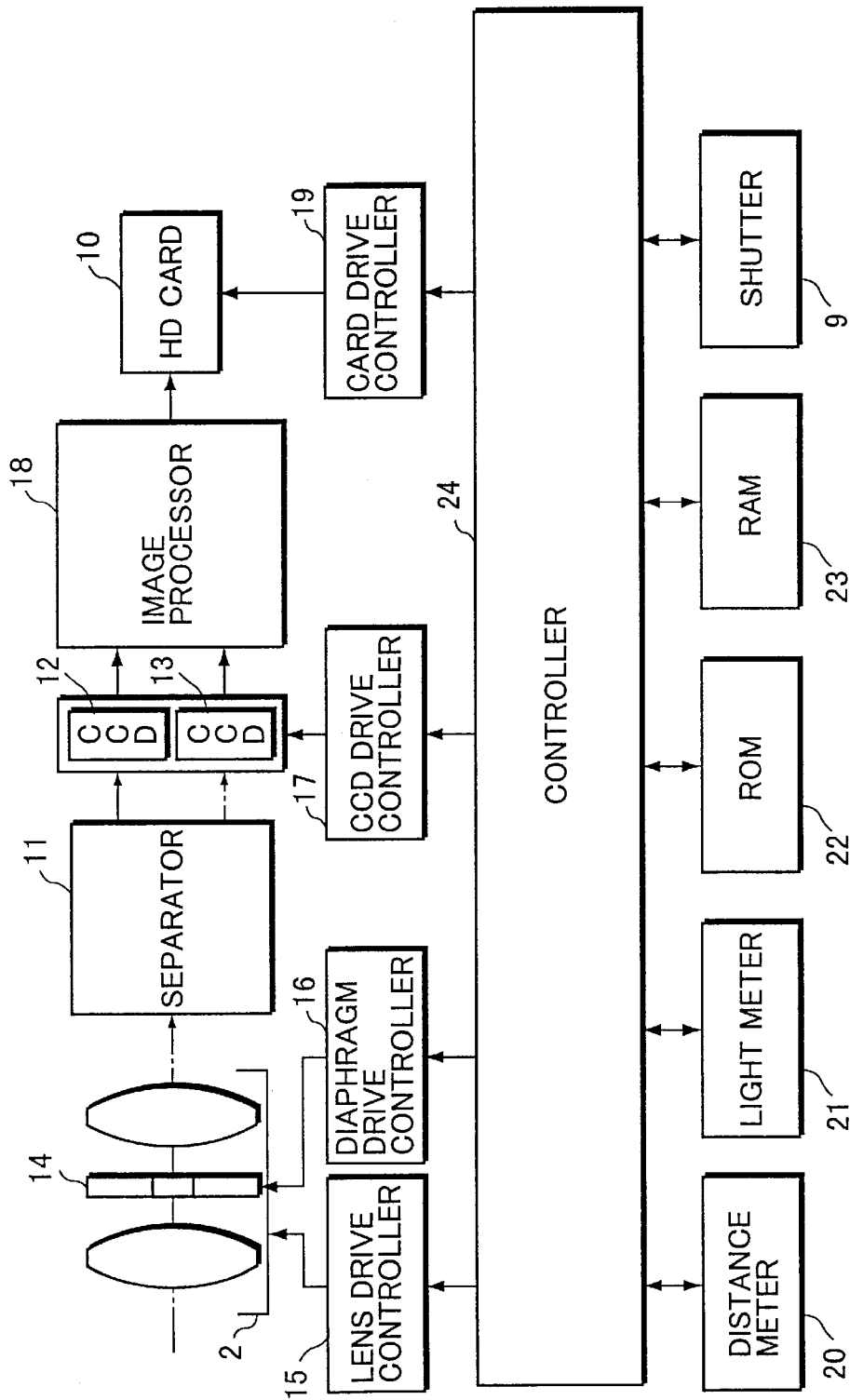
FIG. 6 is a block diagram showing a construction of the electronic camera.

FIG. 6 is a block construction diagram of the electronic camera 1.

In FIG. 6, the same elements as those shown in FIGS. 1 and 2 are identified by the same reference numerals. The image processor according to the invention includes an image processing unit 18, a controller 24, a ROM 22 and a RAM 23.

A diaphragm 14 is a light amount adjusting member provided in the taking lens 2. A lens drive controller 15 performs automatic focusing by driving a focusing lens (not shown) of the taking lens 2. The focusing lens is, for example, so provided at the front end of the taking lens 2 as to be movable along the optic axis, and is moved by a torque from an electric motor (not shown). The lens drive controller 15 automatically focuses the taking lens 2 by controlling the drive of the electronic motor in accordance with an AF control value inputted from the controller 24 for centrally controlling the photographing operation of the camera 1.

A diaphragm drive controller 16 controllably adjusts an aperture of the diaphragm 14 in accordance with an exposure control value (aperture value) inputted from the controller 24. A CCD drive controller 17 controls the image sensing operation (electric charge storage and readout) of the CCDs 12, 13. The CCD drive controller 17 controls an exposure amount by controlling electric charge storing times (integration time) of the CCDs 12, 13 in accordance with an exposure control value (shutter speed) inputted from the controller 24. Upon the completion of the exposure (electric charge storage) of the CCDs 12, 13, the stored electric charges are read out to the image processing unit first from the CCD 12 and then from the CCD 13.

The image processing unit 18 applies specified processings including white balance correction, gamma correction, shading correction and color tone correction to the stored electric charges (image signals) read out from the CCDs 12, 13, and pastes the image picked up by the CCD 12 (picked image corresponding to the left half object light image A1; hereinafter, "left image Q1") and the image picked up by the CCD 13 (picked image corresponding to the right half object light image A2; hereinafter, "right image Q2") together (generates a photographed image corresponding to the whole object light image A). The processings including the shading correction, WB correction, color tone correction and generation of the photographed image are described later.

The HD card 10 is a storage medium for storing the image data representing the photographed image. In the HD card 10 is stored the picked image of the entire object (hereinafter, "picked image Q") obtained by pasting the left and right images Q1, Q2 together. A card drive controller 19 controllably drives the HD card 10 to store the image data.

A distance meter 20 is provided behind the light emitting window 4 and the light receiving window 5 for detecting an object distance. A light meter 21 includes a photodetector such as a silicone photocell (SPC) provided behind the light metering window 3 for detecting an object brightness.

The ROM (read only memory) 22 is a memory for storing data necessary to control the drive of the image sensing system, and data and processing programs necessary for the shading correction, WB correction, color tone correction, image combination, and image data interpolation to be described later. The RAM (random access memory) 23 is a memory used for the image sensing operation of the controller 24.

Figure 7:
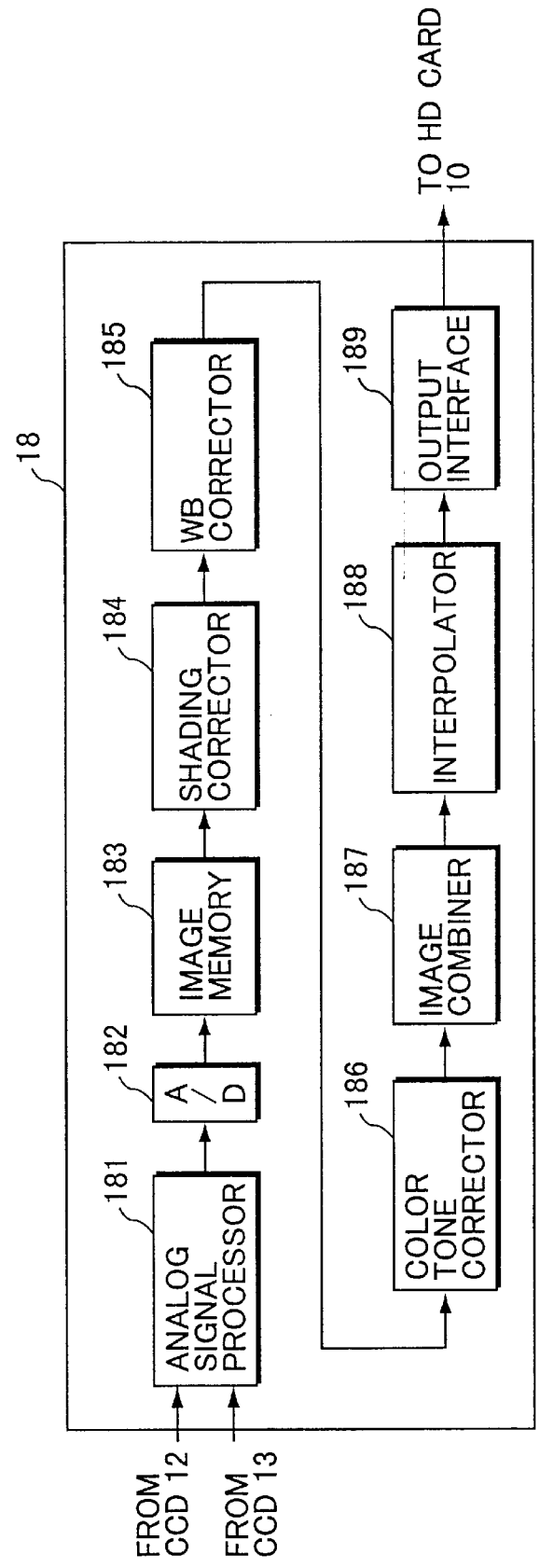
FIG. 7 is a block diagram showing a construction of an image processor.

FIG. 7 is a diagram showing a block construction of the image processing unit 18 for the shading correction, WB correction, color tone correction, photographed image generation, and image data interpolation.

The image processing unit 18 is internally provided with an analog signal processor 181, an analog-to-digital (A/D) converter 182, an image memory 183, a shading corrector 184, a WB corrector 185, a color tone corrector 186, an image combiner 187, an image data interpolator 188 and an output interface 189 for the above processings.

The analog signal processor 181 includes an unillustrated CDS (correlative double sampling) circuit and a signal processing circuit such as an analog amplifier and applies specified signal processings including a noise reduction and a level adjustment (amplification) to analog signals of the respective color components of R, G, B outputted from the CCDs 12, 13. The A/D converter 182 converts an image signal outputted from the analog signal processor 181 into an image data represented by, e.g., a 8-bit digital signal. The image memory 183 temporarily stores the image data outputted from the A/D converter 182 and has storage regions for storing the image data of the image picked up by the CCD 12 and that of the image picked up by the CCD 13. The image data are stored in the respective storage regions for each of the color components R, G, B.

The shading corrector 184 corrects a variation in the output level among the pixels of the sensing surfaces of the CCDs 12, 13. A shading correction is made to correct a variation in the output level among the pixels which is caused when a light image having a uniform density is uniformly focused on the sensing surface of the CCD by the taking lens. The variation in the output level is corrected using a shading correction table in which light reception levels outputted from the respective pixels are set in advance. This shading correction table is stored in the ROM 22.

The WB corrector 185 adjusts brightness ratios (R/G, B/G) of the image data of red and blue components to the image data of green component. The WB corrector 185 corrects the picked image using outputs (G/R, G/B) of a WB sensor built in the camera main body. Since the color CCDs of the Bayer type are used and the color array of the picked image is as shown in FIG. in this embodiment, the brightness in the pixel positions of red and blue components are conformed to that of green component as a whole by being multiplied by the brightness ratio G/R or G/B.

The color tone corrector 186 corrects a color displacement when it is created between the left and right images Q1, Q2 after the WB correction. Specifically, color tone will not differ between the left and right images Q1, Q2 if the WB correction is accurately applied thereto. However, the output of the WB sensor is inclined toward a specific color if a light source is not a daylight, but a fluorescent lamp or the like. Accordingly, even if the WB correction is applied, the obtained image may be red-tinted or blue-tinted as a whole. If the left and right images Q1, Q2 having inclined color tones are pasted and combined together, an image is generated in which color tone differs at the left and right sides. The color tone corrector 186 prevents the color tone from becoming unbalanced during the image combination.

The color tone corrector 186 generates frequency distribution functions of the image data of the left and right images Q1 and Q2 for each of red, green and blue components, and reduces a displacement in color tone between the left and right images Q1, Q2 by correcting the image data of red, green and blue components by a specified correction calculation based on the generated frequency distribution functions.

There are various calculation methods for the color tone correction. In this embodiment, seven calculation methods described below are proposed.

(A) Color Tone Correction I

Figure 8A:
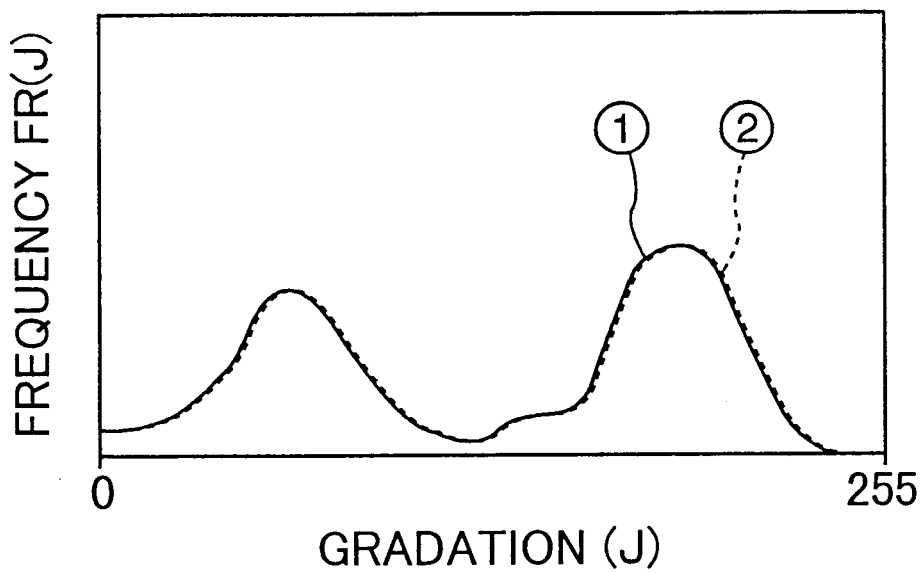
Figure 8B:
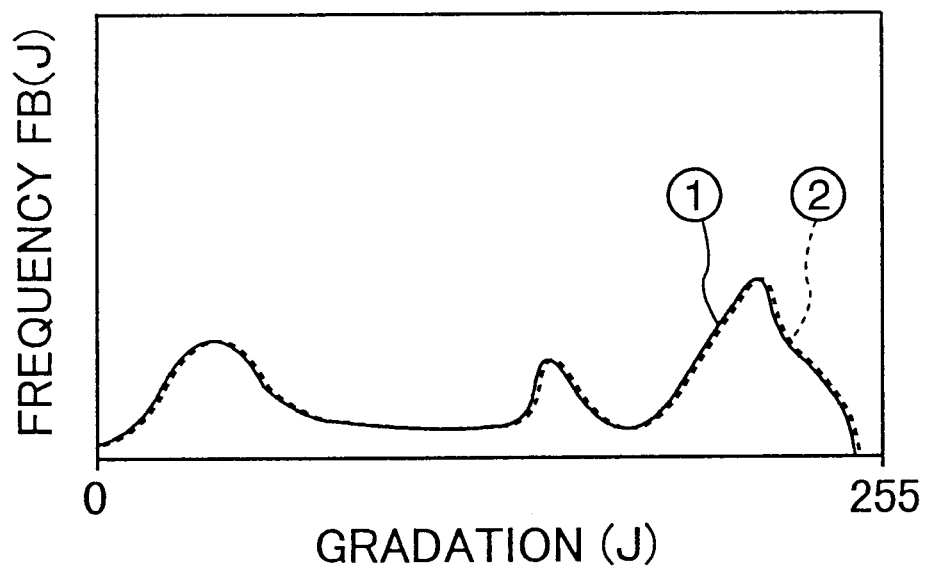

If the WB correction has been accurately performed, frequency distribution curves $\hat{1}$, $\hat{2}$ of the boundary portions C for the color components R, B substantially coincide with each other as shown in FIGS. 8A and 8B since the object images of the boundary portions C are substantially same if the image data of red and blue components are generated for the boundary portions C of the left and right images Q1, Q2. FIG. 8A shows the frequency distribution of the image data of red component, whereas FIG. 8B shows the frequency distribution of the image data of blue component. The frequency distribution curves $\hat{1}$ correspond to the boundary portion C of the left image Q1, whereas the frequency distribution curves $\hat{2}$ correspond to the boundary portion C of the right image Q2.

Figure 9A:
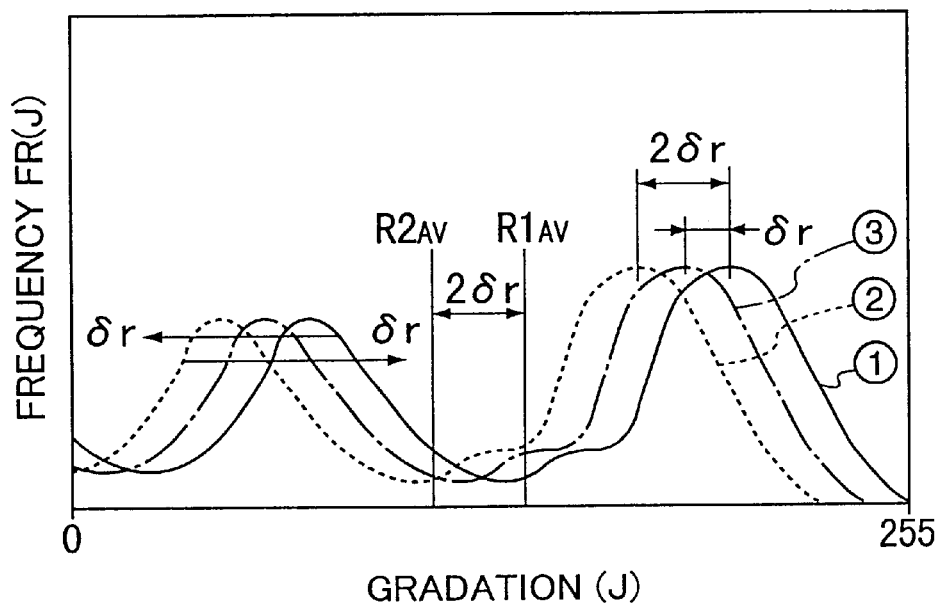
Figure 9B:
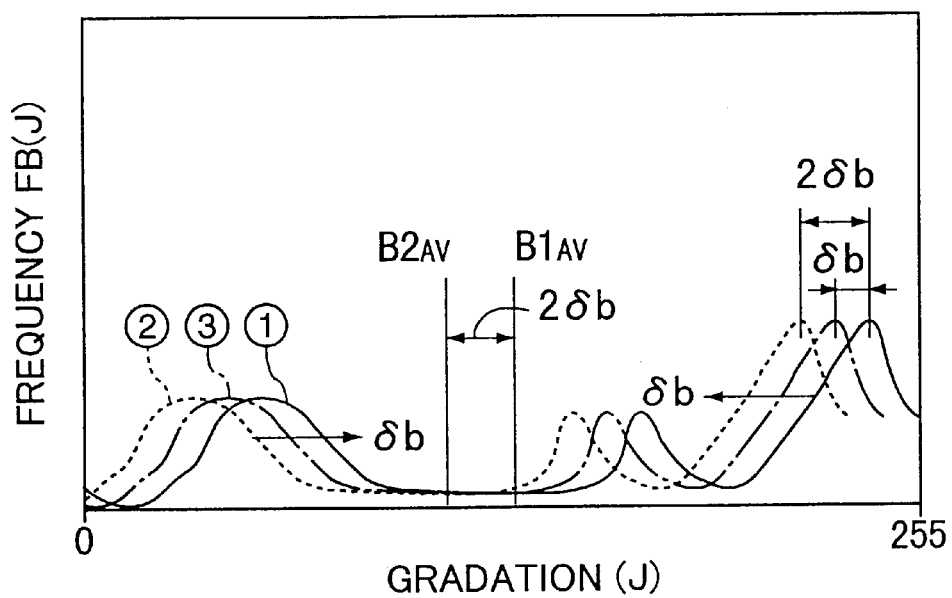

However, If WB gains (R/G, B/G) for the left image Q1 and those for the right image Q2 differ, the frequency distribution curves $\hat{1}$, $\hat{2}$ of the boundary portions C horizontally shift to each other, though taking substantially the same shape, for the respective color components as shown in FIGS. 9A and 9B. In other words, the frequency distribution curves $\hat{1}$, $\hat{2}$ shift to each other along a gradation level axis.

The Color Tone Correction 1 is as follows. If a shift of the distribution curves $\hat{1}$, $\hat{2}$ to each other on the gradation level axis is assumed to be $2\delta r$ in FIG. 9A, the distribution curve $\hat{1}$ is shifted by $-\delta r$ along the gradation level axis while the distribution curve $\hat{2}$ is shifted by $+\delta r$ therealong. Further, if a shift of the distribution curves $\hat{1}$, $\hat{2}$ to each other on the gradation level axis is assumed to be $2\delta r$ in FIG. 9B, the distribution curve $\hat{1}$ is shifted by $-\delta r$ along the gradation level axis while the distribution curve $\hat{2}$ is shifted by $+\delta r$ therealong. In this way, the distribution curves $\hat{1}$, $\hat{2}$ are caused to substantially coincide with each other (i.e., coincide with distribution curves $\hat{3}$). As a result, the image data of red and blue components of the boundary portions C of the left and right images Q1, Q2 are respectively corrected.

Thus, if there is a color tone deviation between the boundary portion C of the left image Q1 and that of the right image Q2, the Color Tone Correction 1 effectively reduces an occurrence of color discontinuity in the boundary portion of the combined image.

The image data correction by the Color Tone Correction 1 is performed by the following calculation procedure.

It is assumed that j denotes the gradation level of frequency distribution functions HR1, HG1, HB1 generated for each of red, green and blue components and fR1(j), fG1(j), fB1(j) denote frequencies at each gradation level for the boundary portion C of the left image Q1; and j denotes the gradation level of frequency distribution functions HR2, HG2, HB2 generated for each of red, green and blue components and fR2(j), fG2(j), fB2(j) denote frequencies at each gradation level for the boundary portion C of the right image Q2; and numR, numG, numB denote total numbers of pixel data of the respective color components.

Since the pixel data is comprised of 8 bits in this embodiment, a range of its level is 0 to 255. In the description below, frequency distribution functions are generated at intervals of "1" (i.e., frequency distribution functions of j=0, 1, 2, . . . 255).

(Step 1)

The frequency distribution functions HR1, HB1, HR2, HB2 are generated and average values $R1_{AV}$, $B1_{AV}$, $R2_{AV}$, $B2_{AV}$ of the respective frequency distribution functions are calculated by following equations (1) to (4).

$$R1_{AV}=[fR1(1)\cdot1+fR1(2)\cdot2+fR1(3)\cdot3+\ldots+fR1(255)\cdot255]/numR = \Sigma fR1(j)\cdot j/numR \ (j=0 \text{ to } 255) \tag{1}$$

$$B1_{AV}=[fB1(1)\cdot1+fB1(2)\cdot2+fB1(3)\cdot3+\ldots+fB1(255)\cdot255]/numB = \Sigma fB1(j)\cdot j/numB (j=0 \text{ to } 255) \tag{2}$$

$$R2_{AV}=[fR2(1)\cdot1+fR2(2)\cdot2+fR2(3)\cdot3+\ldots+fR2(255)\cdot255]/numR = \Sigma fR2(j)\cdot j/numR \ (j=0 \text{ to } 255) \tag{3}$$

$$B2_{AV}=[fB2(1)\cdot1+fB2(2)\cdot2+fB2(3)\cdot3+\ldots+fB2(255)\cdot255]/numB = \Sigma fB2(j)\cdot j/numB \ (j=0 \text{ to } 255) \tag{4}$$

(Step 2)

Offset amounts $\delta r$, $\delta b$ of the frequency distribution curves $\hat{1}$, $\hat{2}$ are calculated. Since the shapes of the frequency distribution curves $\hat{1}$, $\hat{2}$ are substantially same in FIG. 9A, a difference $\Delta R_{AV}=|R2_{AV}-R1_{AV}|$ between the average value $R1_{AV}$ of the frequency distribution curve $\hat{1}$ and the average value $R2_{AV}$ of the frequency distribution curve $\hat{2}$ is $2\delta r$. Accordingly, the offset amount $\delta r$ is calculated by $\Delta R_{AV}/2$. Similarly in FIG. 9B, the offset amount $\delta$ is calculated by $\Delta B_{AV}/2=|B2_{AV}-B1_{AV}|$.

(Step 3)

If R1(i)(i=1, 2, . . . numR), B1(i)(i=1, 2, . . . numB) denote the pixel data of red and blue components included in the boundary portion C of the left image Q1, and R2(i)(i=1, 2, . . . numR), B2(i)(i=1, 2, . . . numB) denote the image data of red and blue components included in the boundary portion C of the right image Q2, the respective pixel data R1(i), R2(i), B1(i), B2(i) are corrected using the offset amounts $\delta r$, $\delta b$.

In order to shift the entire frequency distribution curve $\hat{1}$ to the left by $\delta r$ and shift the entire frequency distribution curve $\hat{2}$ to the right by $\delta r$ in FIG. 9A, the level of each pixel data R1(i) of red component of the boundary portion C of the left image Q1 is lowered by the offset amount $\delta r$ and the level of each pixel data R2(i) of red component of the boundary portion C of the right image Q2 is raised by the offset amount $\delta r$.

$$R1(i)'=R1(i)-\delta r=R1(i)-\Delta R_{AV}/2 \tag{5}$$

$$B1(i)'=B1(i)-\delta b=B1(i)-\Delta B_{AV}/2 \tag{6}$$

$$R2(i)'=R2(i)-\delta r=R2(i)-\Delta R_{AV}/2 \tag{7}$$

$$B2(i)'=B2(i)-\delta b=B1(i)-\Delta B_{AV}/2 \tag{8}$$

where R1(i)'=R2(i)'=B1(i)'=B2(i)'=0 when R1(i)' R2(i)', B1(i)', B2(i)'$\leq$0,

R1(i)'=R2(i)'=Rmax when R1(i)', R2(i)$\geq$Rmax (255 in the 8-bit data),

B1(i)'=B2(i)'=Bmax when B1(i)', B2(i)'$\geq$Rmax (255 in the 8-bit data).

Since a gain adjustment is performed at an accuracy of 1/256 (in the case of an 8-bit data) for the green component, the above correction is not made for the pixel data G1(i), G2(i) (i=1, 2, . . . numG) of the boundary portions C of the left and right images Q1, Q2. However, a correction similar to the one performed for red and blue components may be performed for the green component.

Further, if no accurate offset amounts $\delta r$, $\delta b$ can be calculated due to an excessively low brightness of the boundary portions C, no color tone correction may be performed since the effect of the above color tone correction cannot be expected. In other words, R1($i$)', R2($i$)' are not calculated if SR1<K (predetermined value) or SR2<K, and B1($i$)', B2($i$)' are not calculated if SB1<K (predetermined value) or SB2<K.

(B) Color Tone Correction 2

The method of the Color Tone Correction 1 is designed to reduce color discontinuity which occurs in the boundary portions C of the left and right images Q1, Q2 by shifting the color tone of the boundary portion C of the left image Q1 and that of the boundary portion C of the right image Q2 to a center position of the color tone deviation. Thus, this method is effective in reducing the color discontinuity created during the image combination. However, it is difficult to effectively correct the color displacement if the color tones of the left and right images Q1, Q2 are both inclined in a direction of a color of the same hue. In other words, if the left and right images Q1, Q2 are both red-tinted, an occurrence of color tone (red) discontinuity at the pasted portion of the combined image can be reduced, but the color tone deviation of the whole combined image (red-tinted color tone) cannot be corrected.

The Color Tone Correction 2 is a method for reducing an occurrence of the color discontinuity at the pasted portion of the combined image and correcting the color deviation of the entire combined image. Specifically, in the Color Tone Correction 2, the pixel data R1($i$), B1($i$) are so corrected that the average values $R1_{AV}$, $B1_{AV}$ of the frequency distribution functions HR1, HB1 of the image data of red and blue components substantially coincide with the average value $G1_{AV}$ of the frequency distribution function HG1 of the image data of green component for the boundary portion C of the left image Q1, and the pixel data R2($i$), B2($i$) are so corrected that the average values $R2_{AV}$, $B2_{AV}$ of the frequency distribution functions HR2, HB2 of the image data of red and blue components substantially coincide with the average value $G2_{AV}$ of the frequency distribution function HG2 of the image data of green component for the boundary portion C of the right image Q2.

Since the Color Tone Correction 1 is the method for relatively adjusting the tints of the images in the boundary portions C of the left and right images Q1, Q2 to the same color, a specific tint remains in the target color if the boundary portions C of the images Q1, Q2 are inclined toward the colors of the same hue. In the Color Tone Correction 2, the average values $Ri_{AV}$, $Gi_{AV}$, $Bi_{AV}$ (i=1, 2) of the frequency distribution functions HRi, HGi, HBi (i=1, 2) of red, green and blue components are aligned (i.e., the color tone is adjusted to white as a whole) for the images Q1, Q2. Accordingly, even if the color tone of the images at the boundary portions C of the images Q1, Q2 deviate toward the color of the same hue and the specific color remains in the target color, the remaining specific color component is not left after the image combination by being excluded.

The correction of the image data in the Color Tone Correction 2 is performed in the following calculation procedure.

(Step 1)

Frequency distribution functions HR1, HB1, HG1, HR2, HB2, HG2 are generated, and average values $R1_{AV}$, $B1_{AV}$, $G1_{AV}$, $R2_{AV}$, $B2_{AV}$, $G2_{AV}$ are calculated. The average values $R1_{AV}$, $B1_{AV}$, $R2_{AV}$, $B2_{AV}$ are calculated by the above equa tions (1) to (4), and the average values $G1_{AV}$, $G2_{AV}$ are calculated by following equations (9) and (10).

$$G1_{AV}=[fG1(1)\cdot 1+fG1(2)\cdot 2+fG1(3)\cdot 3+ \ldots +fG1(255)\cdot 255]/numG=\Sigma fG1(j)\cdot j/numG\ (j=0\ to\ 255) \quad (9)$$

$$G2_{AV}=[fG2(1)\cdot 1+fG2(2)\cdot 2+fG2(3)\cdot 3+ \ldots +fG2(255)\cdot 255]/numG=\Sigma fG2(j)\cdot j/numG\ (j=0\ to\ 255) \quad (10)$$

(Step 2)

A difference between the average value $R1_{AV}$ of the frequency distribution function HR1 and the average value $G1_{AV}$ of the frequency distribution function HG1 is calculated as an offset amount δr1 of the pixel data R1($i$), and a difference between the average value $R2_{AV}$ of the frequency distribution function HR2 and the average value $G2_{AV}$ of the frequency distribution function HG2 is calculated as an offset amount δr2 of the pixel data R2($i$) (see following equations (11), (12)). Further, a difference between the average value $B1_{AV}$ of the frequency distribution function HB1 and the average value $G1_{AV}$ of the frequency distribution function HG1 is calculated as an offset amount δb1 of the pixel data B1($i$), and a difference between the average value $B2_{AV}$ of the frequency distribution function HB2 and the average value $G2_{AV}$ of the frequency distribution function HG2 is calculated as an offset amount δb2 of the pixel data B2($i$) (see following equations (13), (14)).

$$\delta r1=G1_{AV}-R1_{AV} \quad (11)$$

$$\delta r2=G2_{AV}-R2_{AV} \quad (12)$$

$$\delta b1=G1_{AV}-B1_{AV} \quad (13)$$

$$\delta b2=G2_{AV}-B2_{AV} \quad (14)$$

(Step 3)

Pixel data R1($i$)', R2($i$)' after the correction are calculated by adding the offset amounts δr1, δr2 to the pixel data R1($i$), R2($i$), respectively (see following equations (15), (16)). Further, pixel data B1($i$)', B2($i$)' after the correction are calculated by adding the offset amounts δb1, δb2 to the pixel data B1($i$), B2($i$), respectively (see following equations (17), (18)).

$$R1(i)'=R1(i)+\delta r1=R1(i)+(G1_{AV}-R1_{AV}) \quad (15)$$

$$R2(i)'=R2(i)+\delta r2=R2(i)+(G2_{AV}-R2_{AV}) \quad (16)$$

$$B1(i)'=B1(i)+\delta r1=B1(i)+(G1_{AV}-B1_{AV}) \quad (17)$$

$$B2(i)'=B2(i)+\delta r1=B2(i)+(G1_{AV}-B2_{AV}) \quad (18)$$

where R1($i$)'=R2($i$)'=B1($i$)'=B2($i$)'=0, when R1($i$)' R2($i$)', B1($i$)', B2($i$)'≦0, R1($i$)'=R2($i$)'=Rmax when R1($i$)', R2($i$)≧Rmax (255 in the 8-bit data), B1($i$)'=B2($i$)'=Bmax when B1($i$)', B2($i$)'≧Rmax (255 in the 8-bit data).

Since a gain adjustment is performed at an accuracy of 1/256 (in the case of an 8-bit data) for the green component, the above correction is not made for the pixel data G1($i$), G2($i$) (i=1, 2, ... numG) of the boundary portions C of the left and right images Q1, Q2. However, a correction similar to the one performed for the color components R, B may be performed for the color component G.

(C) Color Tone Correction 3

The Color Tone Correction 3 is a modification of the Color Tone Correction 2. In the Color Tone Correction 2, for example, the difference between the average value $R1_{AV}$ of the frequency distribution function HR1 of pixel data R1(i) of red component and the average value $G1_{AV}$ of the frequency distribution function HG1 of the pixel data G(i) of green component is used as the offset amount δr1 for the pixel data R1(i). In comparison to this, the offset amount δr1 for the pixel data R1(i) is determined in consideration of the distributed states (center positions and specified widths) of the frequency distribution functions HR1, HG1.

The correction of the image data in the Color Tone Correction 3 is performed in the following calculation procedure.

(Step 1)

The average values $R1_{AV}$, $B1_{AV}$, $G1_{AV}$, $R2_{AV}$, $B2_{AV}$, $G2_{AV}$ are calculated using the frequency distribution curves of the average values $R1_{AV}$, $B1_{AV}$, $G1_{AV}$, $R2_{AV}$, $B2_{AV}$, $G2_{AV}$ above gradation level 20. The average values $R1_{AV}$, $B1_{AV}$, $G1_{AV}$, $R2_{AV}$, $B2_{AV}$, $G2_{AV}$ are calculated by following equations (19) to (24).

$$R1_{AV}=[fR1(20)\cdot 20+fR1(21)\cdot 21+\ldots +fR1(255)\cdot 255]/numR= \Sigma fR1(j)\cdot j/numR \ (j=20 \text{ to } 255) \quad (19)$$

$$B1_{AV}=[fB1(20)\cdot 20+fB1(21)\cdot 21+\ldots +fB1(255)\cdot 255]/numB= \Sigma fB1(j)\cdot j/numB \ (j=20 \text{ to } 255) \quad (20)$$

$$G1_{AV}=[fG1(20)\cdot 20+fG1(21)\cdot 21+\ldots +fG1(255)\cdot 255]/numG= \Sigma fG1(j)\cdot j/numG \ (j=20 \text{ to } 255) \quad (21)$$

$$R2_{AV}=[fR2(20)\cdot 20+fR2(21)\cdot 21+\ldots +fR2(255)\cdot 255]/numR= \Sigma fR2(j)\cdot j/numR \ (j=20 \text{ to } 255) \quad (22)$$

$$B2_{AV}=[fB2(20)\cdot 20+fB2(21)\cdot 21+\ldots +fB2(255)\cdot 255]/numB= \Sigma fB2(j)\cdot j/numB \ (j=20 \text{ to } 255) \quad (23)$$

$$G2_{AV}=[fG2(20)\cdot 20+fG2(21)\cdot 21+\ldots +fG2(255)\cdot 255]/numG= \Sigma fG2(j)\cdot j/numG \ (j=20 \text{ to } 255) \quad (24)$$

(Step 2)

Maximum positions maxR1, maxG1, maxB1, maxR2, maxG2, maxB2 and minimum positions minR1, minG1, minB1, minR2, minG2, minB2 of the frequency distribution functions HR1, HG1, HB1, HR2, HG2, HB2 of the pixel data of the respective color components R, G, B, and widths WR1, WG1, WB1, WR2, WG2, WB2 defined below in (a) and (b) are calculated.

(a) Maximum positions maxR1, maxG1, maxB1, minimum positions minR1, minG1, minB1 and widths WR1, WG1, WB1

Total sums of the frequencies at gradation levels 0 to j in the frequency distribution functions HR1, HG1, HB1 of the pixel data R1(i), G1(i), B1(i) of red, green and blue components are represented by SJ1(j) (=fJ1(0)+fJ1(2)+ ... fJ1(j))(J=R,G,B). Minimum r where SJ1(r)≧η·K in the frequency distribution function HR1, HG1 or HB1 is a maximum position maxR1, maxG1 or maxB1, whereas minimum s where SJ1(s)≧ζ·K (ζ<η) in the frequency distribution function HR1, HG1 or HB1 is a minimum position minR1, minG1 or minB1. The widths WR1, WG1, WB1 are given by:

$WR1 = \max R1 - \min R1$ $WG1 = \max G1 - \min G1$ $WB1 = \max B1 - \min B1$.

(b) Maximum positions maxR2, maxG2, maxB2, minimum positions minR2, minG2, minB2 and widths WR2, WG2, WB2

Total sums of the frequencies at gradation levels 0 to j in the frequency distribution functions HR2, HG2, HB2 of the pixel data R2(i), G2(i), B2(i) of red, green and blue components are represented by SJ2(j) (=fJ2(0)+fJ2(2)+ ... fJ2(j))(J=R,G,B). Minimum r where SJ2(r)≧η·K in the frequency distribution function HR2, HG2 or HB2 is a maximum position maxR2, maxG2 or maxB2, whereas minimum s where SJ2(s)≧ζ·K (ζ<η) in the frequency distribution function HR2, HG2 or HB2 is a minimum position minR2, minG2 or minB2. The widths WR2, WG2, WB2 are given by:

$WR2 = \max R2 - \min R2$ $WG2 = \max G2 - \min G2$ $WB2 = \max B2 - \min B2$.

In the above, K denotes the number of pixel data of each of the color components R, G in the boundary portion C, and η, ζ are coefficients. The coefficients η, ζ may be set at 0.0025 and 0.00025, respectively, for example, in the case of K=63×1392 pixels (W=63, M=1392 in FIG. 4).

Figure 10:
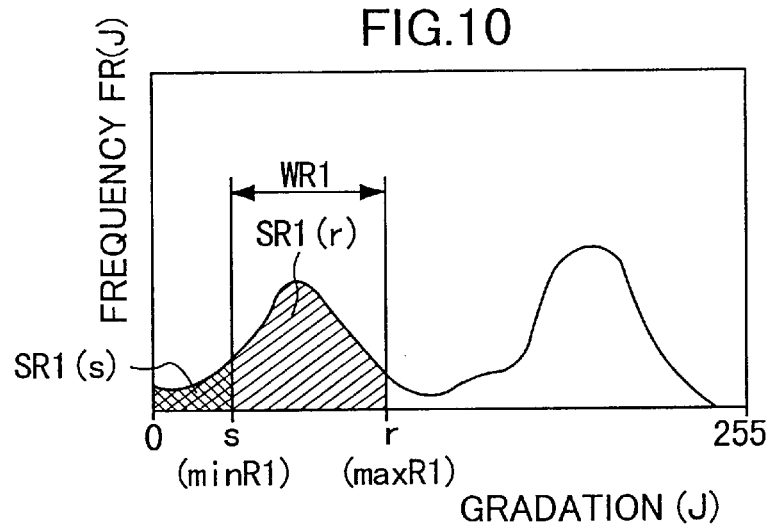
FIG. 10 is a graph showing a maximum position maxR1, a minimum position minR1 and a width WR1 of the red component in the frequency distribution curve of pixel data R1(j)

The meanings of the maximum position maxR1, minimum position minR1 and the width WR1 in (a) are as shown in FIG. 10. Specifically, the maximum position maxR1 represents a gradation level r when an integral value SR1(r) obtained by adding fR1(j) from the level 0 to level r (hatched and cross-hatched areas in FIG. 10) is equal to η·K. The minimum position minR1 is a gradation level s when an integral value SR1(s) obtained by adding fR1(j) from the level 0 to level s (<r) (cross-hatched areas in FIG. 10) is equal to ζ·K (<η·K). The width WR1 represents an interval between the gradation level r and the gradation level s. The same holds for the maximum positions maxG1, maxB1, maxG2, maxB2, the minimum positions minG1, minB1, minR2, minB2 and the widths WG1, WB1, WR2, WG2, WB2.

(Step 3)

Coefficients $\xi_{R1}$, $\xi_{R2}$ for matching the widths WR1, WR2 of the frequency distribution functions HR1, HR2 of red component with the widths WG1, WG2 of the frequency distribution functions HG1, HG2 of green component are calculated, respectively, by equations (25) and (26):

$$\xi_{R1} = WG1/WR1 \quad (25)$$

$$\xi_{R2} = WG2/WR2 \quad (26).$$

Then, coefficients $\xi_{B1}$, $\xi_{B2}$ for matching the widths WB1, WB2 of the frequency distribution functions HB1, HB2 of blue component with the widths WG1, WG2 of the frequency distribution functions HG1, HG2 of green component are calculated, respectively, by equations (27) and (28):

$$\xi_{B1} = WG1/WB1 \quad (27)$$

$$\xi_{B2} = WG2/WB2 \quad (28).$$

(Step 4)

The offset amount δr1, δb1 of the pixel data R1(i), B1(i) of red and blue components in the boundary portion C of the left image Q1 and the offset amount δr2, δb2 of the pixel data R2(i), B2(i) of red and blue components in the boundary portion C of the right image Q2 are calculated by following equations (29) to (31):

$$\delta r1 = G1_{AV} - \xi_{R1} \cdot R1_{AV} \quad (29)$$

$$\delta r2 = G2_{AV} - \xi_{R2} \cdot R2_{AV} \quad (30)$$

$$\delta r1 = G1_{AV} - \xi_{B1} \cdot B1_{AV} \quad (31)$$

$$\delta b2 = G2_{AV} - \xi_{B2} \cdot B2_{AV} \quad (32).$$

Pixel data R1(i)', R2(i)', B1(i)', B2(i)' obtained by correcting the pixel data R1(i), R2(i), B1(i), B2(i) are calculated using these offset amounts δr1, δr2, δb1, δb2 by following equations (33) to (36):

$$R1(i)'=\xi_{R1} \cdot R1(i)+\delta r1 = \xi_{R1} \cdot (R1(i)-R1_{AV})+G1_{AV} \quad (33)$$

$$R2(i)'=\xi_{R2} \cdot R2(i)+\delta r2 = \xi_{R2} \cdot (R2(i)-R2_{AV})+G2_{AV} \quad (34)$$

$$B1(i)'=\xi_{B1} \cdot B1(i)+\delta b1 = \xi_{B1} \cdot (B1(i)-B1_{AV})+G1_{AV} \quad (35)$$

$$B2(i)'=\xi_{B2} \cdot B2(i)+\delta b2 = \xi_{B2} \cdot (B2(i)-B2_{AV})+G2_{AV} \quad (36)$$

where R1(i)'=R2(i)'=B1(i)'=B2(i)'=0
when R1(i)' R2(i)', B1(i)', B2(i)'≦0,
R1(i)'=R2(i)'=Rmax
when R1(i)', R2(i)≧Rmax (255 in the 8-bit data),
B1(i)'=B2(i)'=Bmax
when B1(i)', B2(i)'≧Rmax (255 in the 8-bit data).

Since a gain adjustment is performed at an accuracy of 1/256 (in the case of an 8-bit data) for the green component, the above correction is not made for the pixel data G1(i), G2(i) (i=1, 2, . . . numG) of the boundary portions C of the left and right images Q1, Q2. However, a correction similar to the one performed for the color components R, B may be performed for the color component G.

(D) Color Tone Correction 4

The Color Tone Correction 4 is a combination of the Color Tone Correction 1 and the Color Tone Correction 2 or 3. The methods of the Color Tone Corrections 2, 3 are to reduce the color discontinuity in the boundary portion and correct the color tone deviation even if the left and right images Q1, Q2 are both inclined toward the same color tone. However, for an image of, e.g., an evening glow scene in which the color tone is inclined to a specific color, the correction of the color tone deviation may result in an unintended color tone or an unnatural color tone, thereby causing an image degradation.

In the Color Tone Correction 4, whether or not an image has an inclined color tone is judged, and the Color Tone Correction 1 is applied in the case of the image having an inclined color tone while the Color Tone Correction 2 or 3 is applied in the case of the image free from the color tone deviation.

The image data correction in the Color Tone Correction 4 is performed by the following calculation procedure.
(Step 1)
Similar to (Step 1) of the Color Tone Correction 2, the frequency distribution functions HR1, HB1, HG1, HR2, HB2, HG2 are generated, and the average values $R1_{AV}$, $B1_{AV}$, $G1_{AV}$, $R2_{AV}$, $B2_{AV}$, $G2_{AV}$ are calculated by the above equations (1) to (4), (9), (10).
(Step 2)
Similar to (Step 2) of the Color Tone Correction 2, the offset amount δr1 of the pixel data R1(i) of red component in the boundary portion C of the left image Q1 and the offset amount δr2 of the pixel data R2(i) of red component in the boundary portion C of the right image Q2 are calculated by the above equations (11), (12), and the offset amount δb1 of the pixel data B1(i) of blue component in the boundary portion C of the left image Q1 and the offset amount δb2 of the pixel data B2(i) of blue component in the boundary portion C of the right image Q2 are calculated by the above equations (13), (14).
(Step 3)
If any one of absolute values of the offset values δr1, δr2, δb1, δb2 is equal to or above a predetermined threshold value p1 (for example, about 10 in the case of an 8-bit data), there is judged to be the color tone deviation, and the color tone correction (only the correction of the color discontinuity) is performed by the aforementioned Color Tone Correction 1. If the absolute values of all offset amounts δr1, δr2, δb1, δb2 are below the predetermined threshold value p1, there is judged to be no color tone deviation, and the color tone correction (correction of the color discontinuity and color displacement) is performed by the aforementioned Color Tone Correction 2 or 3.

(E) Color Tone Correction 5

Since pixel data in a low-brightness portion have a low signal-to-noise ratio and has little information on the color tone correction, a better correction effect can be obtained in view of visual characteristics if the color tone correction is performed using only the pixel data in intermediate-tone portions and high-light portions. Specifically, an average value of the frequency distribution function is more likely to match the gradation level where frequency is at maximum and the offset amounts (i.e., correction amounts) are determined by the pixel information representing most of the image by excluding the pixel data in the low-brightness portions. Therefore, the correction effect can be further improved.

The Color Tone Correction 5 improves the correction effect by excluding the pixel data in the low-brightness portion when the frequency distribution function is generated and by excluding the pixel data at low frequencies for the calculation of the average values. Accordingly, this is a modification of the calculation method of the above Color Tone Correction 4.

Figure 11:
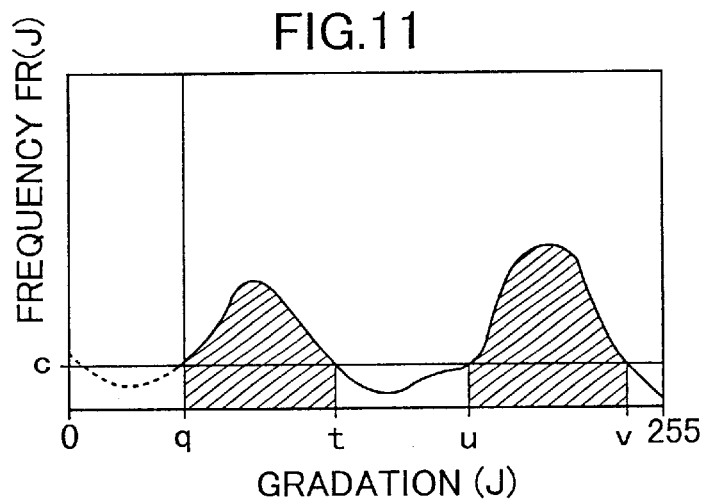
FIG. 11 is a graph showing an exemplary frequency distribution function used to explain a calculation method for calculating an average value using a frequency distribution at or above a predetermined threshold value.

The image data correction in the Color Tone Correction 5 is performed by the following calculation procedure.
(Step 1)
After excluding the pixel data having levels lower than a predetermined threshold value q (for example, about 50 in an 8-bit data) in the boundary portions C of the left and right images Q1, Q2, the frequency distribution functions HR1, HB1, HG1, HR2, HB2, HG2 of the pixel data R1(i), G1(i), B1(i), R2(i), G2(i) and B2(i) of red, green and blue components are generated. The respective frequency distribution functions HR1 to HB2 have gradation levels j from q to 255. For example, the frequency distribution function HR1 of red component may be as shown in FIG. 11, wherein frequencies fr1(j) of a dotted-line portion defined between the gradation levels 0 and q−1 are excluded.
(Step 2)
In the frequency distribution functions HR1, HG1, HB1, HR2, HG2, HB2 between the gradation levels q and 255, average values $R1_{AV}'$, $B1_{AV}'$, $G1_{AV}'$, $R2_{AV}'$, $B2_{AV}'$, $G2_{AV}'$ of the frequency distribution functions are calculated after excluding the frequencies fR1(j), fG1(j), FB1(j), fR2(j), fG2(j), FB2(j) equal to or below a predetermined threshold value c. For example, in the frequency distribution function HR1, the average value $R1_{AV}'$ is calculated by following equation (37) using the frequencies fR1(r) to fR1(t), fR1(u) to fR1(v) in the gradation level ranges [q to t] and [u to v] as indicated by hatching in FIG. 11:

$$R1_{AV}'=[fR1(q) \cdot q + fR1(q+1) \cdot (q+1) + \ldots fR1(t) \cdot t + fR1(u) \cdot u + fR1(u+1) \cdot (u+1) + \ldots fR1(v) \cdot v]/numR \quad (37)$$

where numR denotes the total number of the pixel data of red component.
(Step 3)
The offset amounts δr1, δb1 of the pixel data R1(i), B1(i) of red and blue components in the boundary portion C of the left image Q1 and the offset amount $\delta r2$, $\delta b2$ of the pixel data R2($i$), B2($i$) of red and blue components in the boundary portion C of the right image Q2 are calculated by following equations (38) to (41).

$$\delta r1 = G1_{AV}' - R1_{AV}' \qquad (38)$$

$$\delta r2 = G2_{AV}' - R2_{AV}' \qquad (39)$$

$$\delta b1 = G1_{AV}' - B1_{AV}' \qquad (40)$$

$$\delta b2 = G2_{AV}' - B2_{AV}' \qquad (41).$$

(Step 4)

It is judged whether any of the absolute values of the offset amounts $\delta r1$, $\delta b1$, $\delta r2$, $\delta b2$ is equal to or above a predetermined threshold value p2 (for example, about 0 to 50 in the case of an 8-bit data).

If any of the absolute values of the offset amounts $\delta r1$, $\delta b1$, $\delta r2$, $\delta b2$ is equal to or above the predetermined threshold value p2, the offset amounts $\delta r1$, $\delta b1$, $\delta r2$, $\delta b2$ are changed by following equations (42) to (45):

$$\delta r1 = G2_{AV}' - R1_{AV}'/2 \qquad (42)$$

$$\delta r1 = G2_{AV}' - B2_{AV}'/2 \qquad (43)$$

$$\delta b2 = G1_{AV}' - R1_{AV}'/2 \qquad (44)$$

$$\delta b2 = G1_{AV}' - B2_{AV}'/2 \qquad (45).$$

The offset amounts $\delta r1$, $\delta b1$, $\delta r2$, $\delta b2$ are not changed if the absolute values of all offset amounts $\delta r1$, $\delta b1$, $\delta r2$, $\delta b2$ are below the predetermined threshold value p2.

(Step 5)

If any of the offset amounts $\delta r1$, $\delta b1$, $\delta r2$, $\delta b2$ set in Step 4 or 5 is equal to or above a predetermined threshold value p1 (for example, about 10 in the case of an 8-bit data), there is judged to be the color tone deviation, and the color tone is corrected by the above Color Tone Correction 1. If all offset amounts $\delta r1$, $\delta b1$, $\delta r2$, $\delta b2$ are below the predetermined threshold value p1, there is judged to be no color tone deviation and the color tone is corrected by the above Color Tone Correction 2 or 3.

(F) Color Tone Correction 6

The Color Tone Correction 6 is a modification of the above Color Tone Correction 4. In the Color Tone Correction 4, the color tone deviation is judged based on whether or not the differences between the average values $Ri_{AV}$, $Bi_{AV}$ of the frequency distribution functions HRi, HBi (i=1, 2) of red and blue components and the average value $Gi_{AV}$ of the frequency distribution function HGi of green component exceed the predetermined threshold value p1 (for example, 10 in the case of an 8-bit data). However, in the Color Tone Correction 6, the color tone deviation is judged based on whether mutual differences of the average values $Ri_{AV}$, $Bi_{AV}$, $Gi_{AV}$ of the frequency distribution functions HRi, HBi, HGi, of red, blue and green components are equal to or above a predetermined threshold value p3 (for example, 50 in the case of an 8-bit data).

Further, in the Color Tone Correction 4, the differences $\delta ri$ (=$Gi_{AV}$−$Ri_{AV}$), $\delta bi$ (=$Gi_{AV}$−$Bi_{AV}$) between the average values $Ri_{AV}$, $Bi_{AV}$ of the frequency distribution functions HRi, HBi and the average value $Gi_{AV}$ of the frequency distribution function HGi are used as the offset amounts if there is no color tone deviation. However, in the Color Tone Correction 6, ½ of the offset amounts $\delta r1$, $\delta b1$, $\delta r2$, $\delta b2$ are assumed as second offset amounts $\gamma r1$, $\gamma b1$, $\gamma r2$, $\gamma b2$, and offset amounts $\delta r1$ (=−$\Delta R_{AV}/2$), $\delta r2$ (=$\Delta R_{AV}/2$), $\delta b1$ (=−$\Delta B_{AV}/2$), $\delta b2$ (=$\Delta B_{AV}/2$) calculated in the Color Tone Correction 1 are assumed as first offset amounts, and added values of the first offset amounts $\delta r1$, $\delta b1$, $\delta r2$, $\delta b2$ and the second offset amounts $\gamma r1$, $\gamma b1$, $\gamma r2$, $\gamma b2$ are assumed as offset amounts $\Delta r1$, $\Delta r2$, $\Delta b1$, $\Delta b2$. In other words, both the color discontinuity and the color deviation are corrected by adding the first offset amounts for the correction of the color discontinuity and the second offset amounts for the correction of the color deviation.

The second offset amounts $\gamma ri$, $\gamma bi$ in the Color Tone Correction 6 are set at ½ of the differences $\delta ri$, $\delta bi$ between the average values $Ri_{AV}$, $Bi_{AV}$ of the frequency distribution functions HRi, HBi of red and blue components and the average value $Gi_{AV}$ of the frequency distribution function HGi of green component for the following reason. Since the color tone deviation is judged only based on the pixel data of the boundary portion, the color tone deviation of the entire left and right images may be not reflected. Accordingly, an excessive correction of the color deviation of the combined image is prevented by moderating the second offset amounts for the correction of the color deviation.

The image data correction in the Color Tone Correction 6 is performed by the following calculation procedure.

(Step 1)

Similar to (Step 1) of the Color Tone Correction 2, the frequency distribution functions HR1, HB1, HG1, HR2, HB2, HG2 are generated, and the average values $R1_{AV}$, $B1_{AV}$, $G1_{AV}$, $R2_{AV}$, $B2_{AV}$, $G2_{AV}$ of the respective frequency distribution functions are calculated by the above equations (1) to (4), (9), (10).

(Step 2)

The first offset amounts $\delta r1$, $\delta b1$ of the pixel data R1($i$), B1($i$) of red and blue components in the boundary portion C of the left image Q1 and the first offset amount $\delta r2$, $\delta b2$ of the pixel data R2($i$), B2($i$) of red and blue components in the boundary portion C of the right image Q2 are calculated by following equations (46) to (49):

$$\delta r1 = (R2_{AV} - R1_{AV})/2 \qquad (46)$$

$$\delta b1 = (B2_{AV} - B1_{AV})/2 \qquad (47)$$

$$\delta r2 = (R1_{AV} - R2_{AV})/2 \qquad (48)$$

$$\delta b1 = (B2_{AV} - B1_{AV})/2 \qquad (49).$$

Further, the second offset amounts $\gamma r1$, $\gamma b1$ of the pixel data R1($i$), B1($i$) of red and blue components in the boundary portion C of the left image Q1 and the second offset amount $\gamma r2$, $\gamma b2$ of the pixel data R2($i$), B2($i$) of red and blue components in the boundary portion C of the right image Q2 are calculated by following equations (50) to (53):

$$\gamma r1 = (G1_{AV} - R1_{AV})/2 \qquad (50)$$

$$\gamma b1 = (G1_{AV} - B1_{AV})/2 \qquad (51)$$

$$\gamma r2 = (G2_{AV} - R2_{AV})/2 \qquad (52)$$

$$\gamma b2 = (G2_{AV} - B2_{AV})/2 \qquad (53).$$

Further, the offset amounts $\Delta r1$, $\Delta r2$, $\Delta b1$, $\Delta b2$ are calculated by following equations (54) to (57):

$$\Delta r1 = \delta r1 + \gamma r1 = (R2_{AV} + G1_{AV} - 2 \cdot R1_{AV})/2 \qquad (54)$$

$$\Delta b1 = \delta b1 + \gamma b1 = (B2_{AV} + G1_{AV} - 2 \cdot B1_{AV})/2 \qquad (55)$$

$$\Delta r2 = \delta r2 + \gamma r2 = (R1_{AV} + G2_{AV} - 2 \cdot R2_{AV})/2 \qquad (56)$$

$$\Delta b1 = \delta b1 + \gamma b1 = (B1_{AV} + G2_{AV} - 2 \cdot B2_{AV})/2 \qquad (57)$$

(Step 3)

Absolute values $\Delta rg1$, $\Delta gb1$, $\Delta r1$, $\Delta rg2$, $\Delta gb2$, $\Delta \delta r2$ of mutual differences of the average values $R1_{AV}$, $G1_{AV}$, $B2_{AV}$, $R2_{AV}$, $G2_{AV}$, $B2_{AV}$ of the frequency distribution functions of red, green and blue components are calculated by following equations (58) to (63):

$$\Delta rg1 = |R1_{AV} - G1_{AV}| \qquad (58)$$

$$\Delta gb1 = |G1_{AV} - B1_{AV}| \qquad (59)$$

$$\Delta br1 = |B1_{AV} - R1_{AV}| \qquad (60)$$

$$\Delta rg2 = |R2_{AV} - G2_{AV}| \qquad (61)$$

$$\Delta gb2 = |G2_{AV} - B2_{AV}| \qquad (62)$$

$$\Delta br2 = |B2_{AV} - R2_{AV}| \qquad (63)$$

It is then judged whether any of the absolute values $\Delta rg1$, $\Delta gb1$, $\Delta r1$, $\Delta rg2$, $\Delta gb2$, $\Delta r2$ is equal to or above a predetermined threshold value p3 (for example, about 50 in the case of an 8-bit data).

If any of the absolute values $\Delta rg1$ to $\Delta br2$ is equal to or above the threshold value p3, the color tone deviation is judged, and the color tone is corrected using the first offset values $\delta r1$, $\delta r2$, $\delta b1$, $\delta b2$. In other words, pixel data R1(i)', B1(i)', R2(i)' and B2(i)' after the correction are calculated by following equations (64) to (67). It should be noted that this color tone correction corresponds to the above Color Tone Correction 1 (correction of only the color discontinuity).

$$R1(i)' = R1(i) + \delta b1 = R1(i) + (R2_{AV} - R1_{AV})/2 \qquad (64)$$

$$B1(i)' = B1(i) + \delta b1 = B1(i) + (B2_{AV} - B1_{AV})/2 \qquad (65)$$

$$R2(i)' = R2(i) + \delta r2 = R1(i) + (R1_{AV} - R2_{AV})/2 \qquad (66)$$

$$B2(i)' = B2(i) + \delta b2 = B2(i) + (B1_{AV} - B2_{AV})/2 \qquad (67)$$

where $R1(i)' = R2(i)' = B1(i)' = B2(i)' \leq 0$, when $R1(i)'$ $R2(i)'$, $B1(i)'$, $B2(i)' \leq 0$, $R1(i)' = R2(i)' = R\max$ when $R1(i)'$, $R2(i) \geq R\max$ (255 in the 8-bit data), $B1(i)' = B2(i)' = B\max$ when $B1(i)'$, $B2(i)' \geq R\max$ (255 in the 8-bit data).

If all absolute values $\Delta rg1$ to $\Delta br2$ are below the threshold value p3, no color tone deviation is judged, and the color tone is corrected suing the offset amounts $\Delta r1$, $\Delta b1$, $\Delta r2$, $\Delta b2$. In other words, pixel data R1(i)', B1(i)', R2(i)' and B2(i)' after the correction are calculated by following equations (68) to (71).

$$R1(i)' = R1(i) + \Delta r1 = R1(i) + (R2_{AV} + G1_{AV} - 2 \cdot R1_{AV})/2 \qquad (68)$$

$$B1(i)' = B1(i) + \Delta b1 = B1(i) + (B2_{AV} + G1_{AV} - 2 \cdot B1_{AV})/2 \qquad (69)$$

$$R2(i)' = R2(i) + \Delta r2 = R2(i) + (R1_{AV} + G2_{AV} - 2 \cdot R2_{AV})/2 \qquad (70)$$

$$B2(i)' = B2(i) + \Delta b1 = B2(i) + (B1_{AV} + G2_{AV} - 2 \cdot B2_{AV})/2 \qquad (71)$$

where $R1(i)' = R2(i)' = B1(i)' = B2(i)' = 0$ when $R1(i)'$ $R2(i)'$, $B1(i)'$, $B2(i)' \leq 0$, $R1(i)' = R2(i)' = R\max$ when $R1(i)'$, $R2(i) \geq R\max$ (255 in the 8-bit data), $B1(i)' = B2(i)' = B\max$ when $B1(i)'$, $B2(i)' \geq R\max$ (255 in the 8-bit data).

Since a gain adjustment is performed at an accuracy of 1/256 (in the case of an 8-bit data) for the green component, the above correction is not made for the pixel data G1(i), G2(i) (i=1, 2, ... numG) of the boundary portions C of the left and right images Q1, Q2. However, a correction similar to the one performed for the color components R, B may be performed for the color component G.

(G) Color Tone Correction 7

The Color Tone Correction 7 is also a modification of the Color Tone Correction 2. In the Color Tone Correction 2, the color tone is corrected by adding the offset amounts $\delta r1$, $\delta b1$, $\delta r2$, $\delta b2$ to the pixel data R1(j), R2(j), B1(j), B2(j). However, in the Color Tone Correction 7, the offset amounts $\delta r1$, $\delta b1$, $\delta r2$, $\delta b2$ are corrected to be smaller than calculated values if they are equal to or below a predetermined threshold value p4 (for example, about 20 in the case of an 8-bit data).

Figure 12:
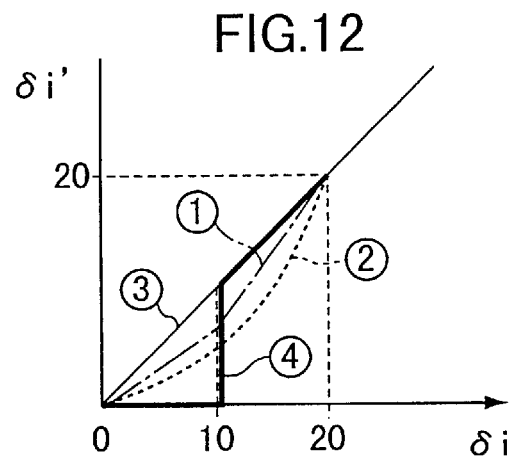
FIG. 12 is a graph showing a method for correcting offset amounts in Color Tone Correction 7.

FIG. 12 is a graph showing exemplary correction tables for the calculated offset amounts $\delta r1$, $\delta b1$, $\delta r2$, $\delta b2$, wherein table $\hat{1}$ represents a kinked line characteristic and table $\hat{2}$ represents a curve characteristic. Although two kinds of characteristics are shown in FIG. 12, characteristics are not limited to these, but any desired non-linearly varying characteristic can be used.

The kinked line characteristic of table $\hat{1}$ is formed by connecting two straight lines at $\delta i=10$ (i=r, g, b) and is represented by following equation (72). Further, table $\hat{2}$ is represented by a curve such as a portion of a parabola.

$$0 \leq \delta i < 10; \; \delta i' = a \cdot \delta i (a < 1)$$

$$10 \leq \delta i < 20; \; \delta i' = (2-a) \cdot \delta i + 20 \cdot (a-1)$$

$$20 \leq \delta i; \; \delta i' = \delta i \qquad (72)$$

Table $\hat{3}$ represents calculation of the offset amounts $\delta r1$, $\delta b1$, $\delta r2$, $\delta b2$ by equations (11) to (14), and shows the case of the Color Tone Correction 2. Table 4 shows a case where the Color Tone Correction 1 is applied without using the calculated values by equations (11) to (14) when the offset amount $\delta i$ (i=r,g, b) is smaller than 10 in the 8-bit data (i.e., the case of the Color Tone Correction 4).

Although the correction calculation is performed using only the pixel data in the boundary portions C of the left and right images Q1, Q2 in the above Color Tone Corrections 1 to 7, all pixel data of the left and right images Q1, Q2 may be used for it. The former method enables a high-speed processing since the total number of pixel data to be handled is small, whereas the latter method has an advantage of improved correction accuracy since the total number of pixel data to be handled is large.

Further, in the above Color Tone Corrections 1 to 7, since the color image is picked up while being separated into color components of R, G, B, the color discontinuity and the color tone deviation in the boundary portion are reduced by applying a correction to the images of red and blue components contributing to the color tone of the color image. In general, if the color image is comprised of images of a plurality of color components, such offset amounts as to match the average value of the frequency distribution function of the pixel data of the left image Q1 with the average value of the frequency distribution function of the pixel data of the right image Q2 (offset amounts in the Color Tone Correction 1) are calculated, or such offset amounts as to match the average values of the frequency distribution functions of the pixel data of all color components (offset amounts in the Color Tone Correction 2) are calculated for the image of the color component contributing to the color tone. If the pixel data of the corresponding color component are corrected using these offset amounts, effects similar to those of the above Color Tone Correction 1 or 2 can be obtained.

Accordingly, depending on a relative displacement of the color tone of the left and right images Q1, Q2, the color discontinuity and the color tone deviation in the boundary portion can be reduced if the above correction is applied to the image of at least one color component.

Referring back to FIG. 7, the image combiner 187 generates the picked image Q of the whole object by pasting the left image Q1 picked up by the CCD 12 and the right image Q2 picked up by the CCD 13 together at the boundary portions C.

The image combiner 187 generates an image of the boundary portion C for the image combination (i.e., an image in which density discontinuity is inconspicuous at the pasted portion: hereinafter, boundary image Qc) in which density continuously varies from the left image Q1 over to the right image Q2 using the image of the boundary portion C in the left image Q1 (hereinafter, left boundary image Qc1) and the image of the boundary portion C in the right image Q2 (hereinafter, right boundary image Qc2), and generates the picked image Q by combining the boundary image Qc and the left and right images Q1, Q2 excluding the left and right boundary images Qc1, Qc2. The image combination for the picked image Q is performed for each of red, green and blue components. Subsequently, the image data representing the picked image Q of the whole object generated by the image combiner 187 is inputted to the image data interpolator 188, where the pixel data are interpolated.

Figure 13A:
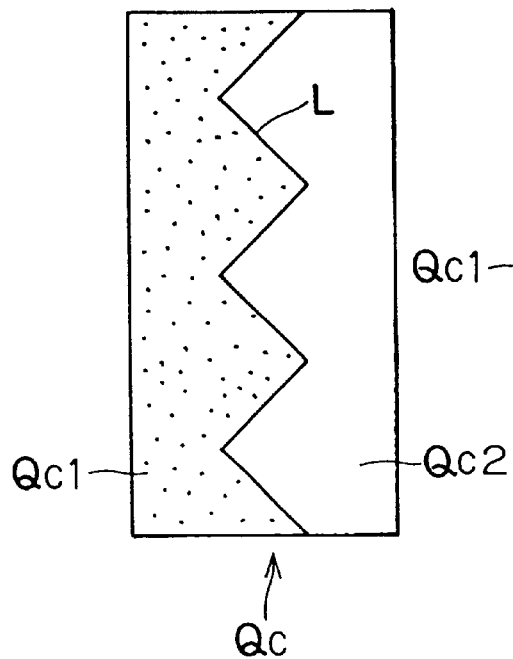
FIGS. 13A and 13B are diagrams showing a boundary image generating method, wherein a boundary is serrated in FIG. 13A and is sinusoidal in FIG. 13B.
Figure 13B:
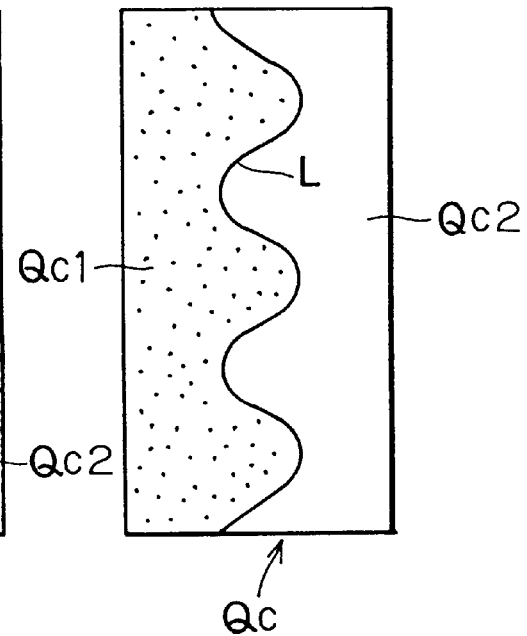

The image combiner 187 performs the image combination according to a method for simply pasting the left and right boundary images Qc1, Qc2 together such that a boundary line L vertically extends in a zigzag manner, for example, as shown in FIGS. 13A and 13B.

The boundary line L is serrated in FIG. 13A, whereas it is sinusoidal in FIG. 13B. To the greater degree the boundary line L is zigzagged, the more sudden density change can be alleviated. Accordingly, the boundary line L is preferably in a zigzag shape which has no regularity and varies to a large extent. The vertically extending zigzag shape of the boundary line L is not limited to the examples of FIGS. 13A and 13B, but may take a variety of shapes except a linear shape.

The image combiner 187 generates the boundary image Qc by reading a part of the image data up to a paste position for each line from the image data of the left and right boundary images Qc1, Qc2 stored in a memory provided therein and simply combining them together in order to generate a preset vertically extending zigzag shape of the boundary line L.

Figure 14:
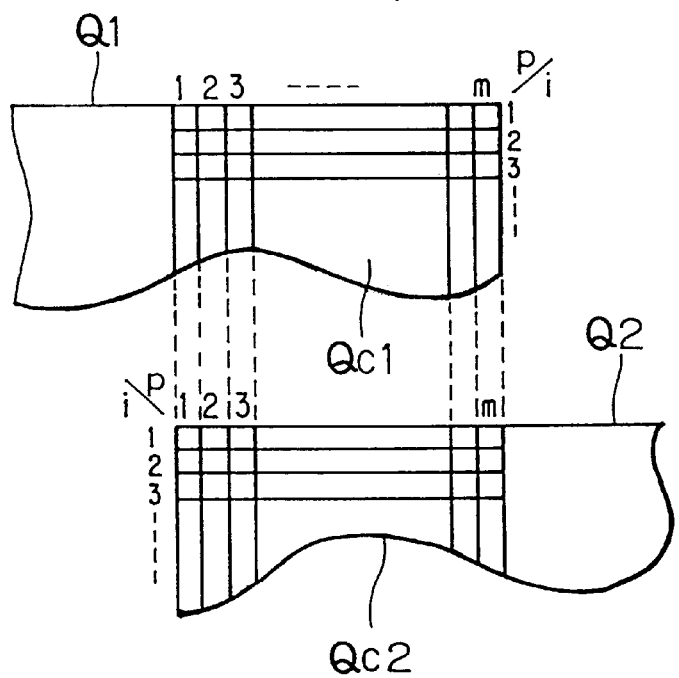
FIG. 14 is a diagram showing horizontal addresses of an image data in the boundary portion.

Now let it be assumed that there are m pixels along the horizontal direction of the boundary image Qc, addresses p of the pixel positions along the horizontal direction of the boundary images Qc1, Qc2 are p=1, 2, . . . m from the left end to the right end as shown in FIG. 14. If $r(i)$ denotes paste positions (addresses of the pixel of the left boundary image Qc1 adjacent to the boundary line L) of the image data in the i-th row, the pixel data $Dc(i,p)$ in the pixel position of the boundary image Qc is defined as follows:

$1 \leq p \leq r(i)$ $Dc(i,p) = Dc1(i,p)$ $r(i) < p \leq m$ $Dc(i,p) = Dc2(i,p)$.

where $Dc1(i,p)$ represents the image data in pixel position $(i,p)$ of the left boundary image Qc1, and $Dc2(i,p)$ represents the image data in pixel position $(i,p)$ of the right boundary image Qc2.

The image data interpolator 188 supplements the image data in the pixel position lacking a data by the interpolation for each of red, green and blue components. The output interface 189 is an interface for outputting the image data of the picked image Q from the image data interpolator 188 to the HD card 10.

Since the CCDs 12, 13 are single-plate color CCDs of the Bayer type, the images of red, green and blue components have pixel positions where no image data exists (see FIGS. 5 and 15), and pixel density does not match among the color components (hereinafter, the image data in the pixel position is referred to as a pixel data in order to distinguish it from other image data). The image data interpolator 188 enables the display of the picked image on a color CRT or the printing thereof by a printer by matching the pixel densities of the images of red, green and blue components.

Specifically, the image data interpolator 188 interpolates the pixel data in the even-numbered columns and the pixel data at intersections of the even-numbered rows and odd-numbered columns for the image of red component; interpolates the pixel data in the odd-numbered columns and the pixel data at intersections of the odd-numbered rows and even-numbered columns for the image of blue component: and interpolates the pixel data at the intersections of the odd-numbered row and the odd-numbered columns and the pixel data at intersections of the even-numbered rows and even-numbered columns for the image of green component.

Figure 15:
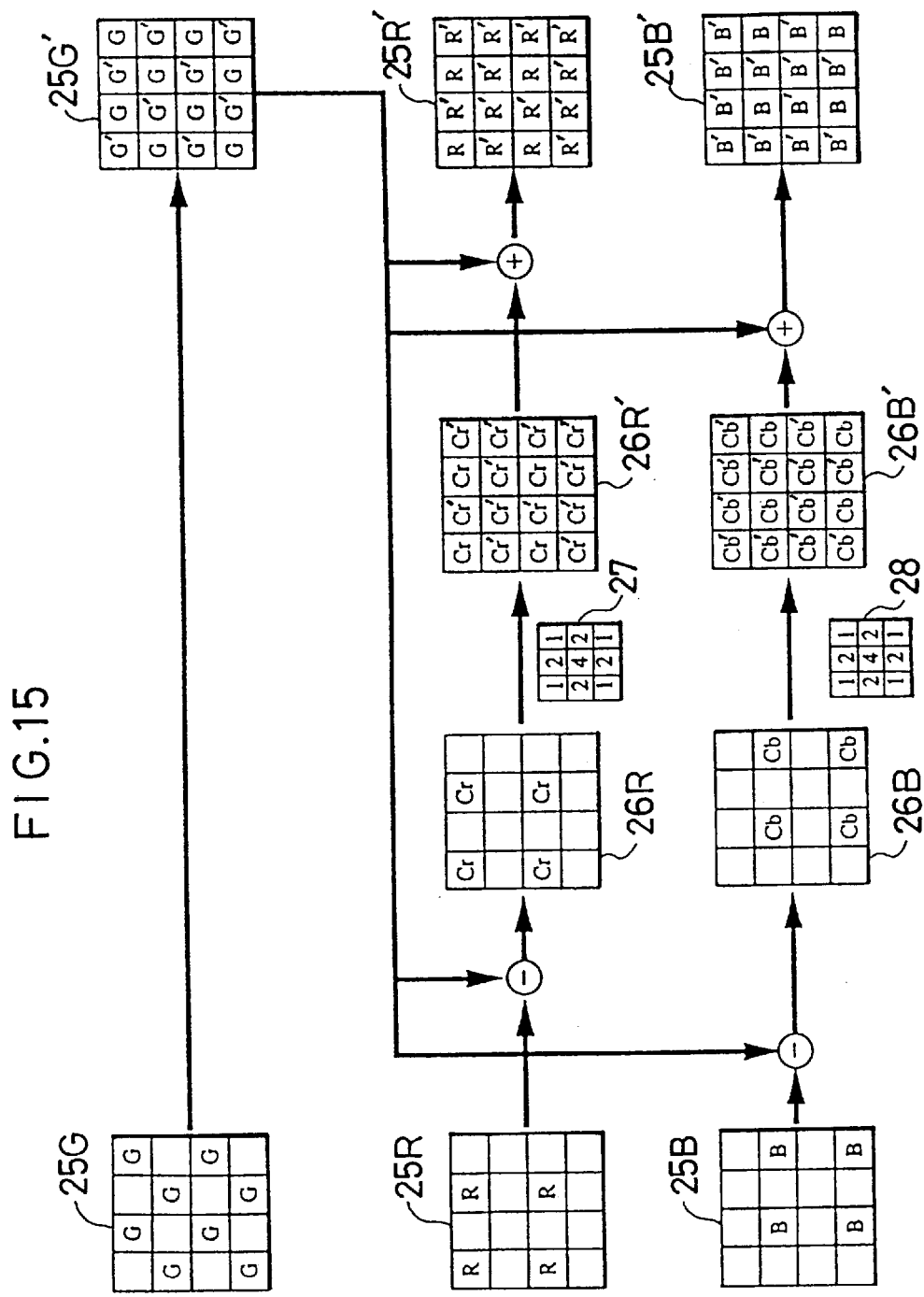
FIG. 15 is a chart showing an interpolation procedure for interpolating image data of the images of red, green and blue components.

The aforementioned image data interpolation is applied to the images of red, green and blue components, for example, in accordance with a processing procedure shown in FIG. 15.

In image data 25R, 25G, 25B of red, green and blue components in FIG. 15, pixel positions marked with "R", "G", "B" in matrices indicate the presence of the pixel data therein, and empty pixel positions indicate the absence of the pixel data (i.e., pixel positions where interpolation should be performed). Further, image data 25R', 25G' and 25B' denote image data after the interpolation, and symbols R', G', B' indicate the presence of the interpolated pixel data. Further, a color difference data 26R is obtained by converting the image data 25R of red component into a color difference data using the interpolated image data 25G' of green component, and a color difference data 26R' is obtained by interpolating the color difference data 26R using a preset interpolation filter 27. Likewise, a color difference data 26B is obtained by converting the image data 25B of blue component into a color difference data using the interpolated image data 25G' of green component, and a color difference data 26B' is obtained by interpolating the color difference data 26B using a preset interpolation filter 28. Symbols Cr, Cb in the matrices indicate the presence of the color difference data, whereas symbols Cr', Cb' indicate the presence of the interpolated color difference data.

For the image data 25G of G, the pixel data in pixel positions $(2\zeta+1, 2\xi+1)$, $(2\zeta+2, 2\xi+2)$ to be interpolated are each interpolated by an average value of two of the four pixel data in the pixel positions adjacent thereto excluding the maximum and minimum values. For example, the image G(2,2) in the pixel position (2,2) is calculated by (G(3,2)+ G(2,1))/2 if G(1,2), G(2,3) are maximum and minimum values or vice versa among the pixel data G(1,2), G(2,3), G(3,2), G(2,1) in the adjacent pixel positions. In the pixel position (1, 1) or other pixel positions at the corner where there are only two adjacent pixel data, the pixel data therein is interpolated by an average value of these two pixel data. Further, in the pixel position (3,1) or other pixel positions where there are three adjacent pixel data, the pixel data therein is interpolated by an average value of the two pixel data excluding the maximum or minimum value.

For the image data 25R, 25B of red and blue components, the color data R, B are converted into the color difference data Cr, Cb using the interpolated image data of green component, and interpolation is performed to the color difference data 26R, 26B using the preset interpolation filters 27, 28. The image data 25R', 25B' of red and blue components after the interpolation are obtained by reconverting the interpolated color difference data 26R', 26B' into the color data R, B using the interpolated image data 25G' of green component.

For example, the interpolation for the pixel position (2,2) of the image data 25R of red component is performed as follows. First, the interpolated pixel data G(1,1)', G(1,3)', G(3,1)', G(3,3)' of green component are subtracted from the pixel data R(1,1), R(1,3), R(3,1), R(3,3) in the pixel positions (1,1), (1,3), (3,1), (3,3) to generate the color difference data Cr(1,1), Cr(1,3), Cr(3,1), Cr(3,3). Subsequently, the color difference data Cr(2,2) in the pixel position (2,2) is supplemented by applying filtering to the color difference data Cr(1,1), Cr(1,3), Cr(3,1), Cr(3,3) using the interpolation filter 27. Since a filtering coefficient for Cr(1,1), Cr(1,3), Cr(3,1), Cr(3,3) is "1" in the interpolation filter 27 in this embodiment, the color difference data Cr(2,2) is: Cr(2,2)= Cr(1,1)+Cr(1,3)+Cr(3,1)+Cr(3,3). Consequently, the pixel data R(2,2)' comprised of the color data R is generated by adding the interpolated pixel data of green component to the interpolated color difference data Cr(2,2).

The image data 25R', 25G', 25B' obtained by the interpolations in the image data interpolator 188 are transferred to the HD card 10 via the output interface 189 and stored therein.

Figure 16:
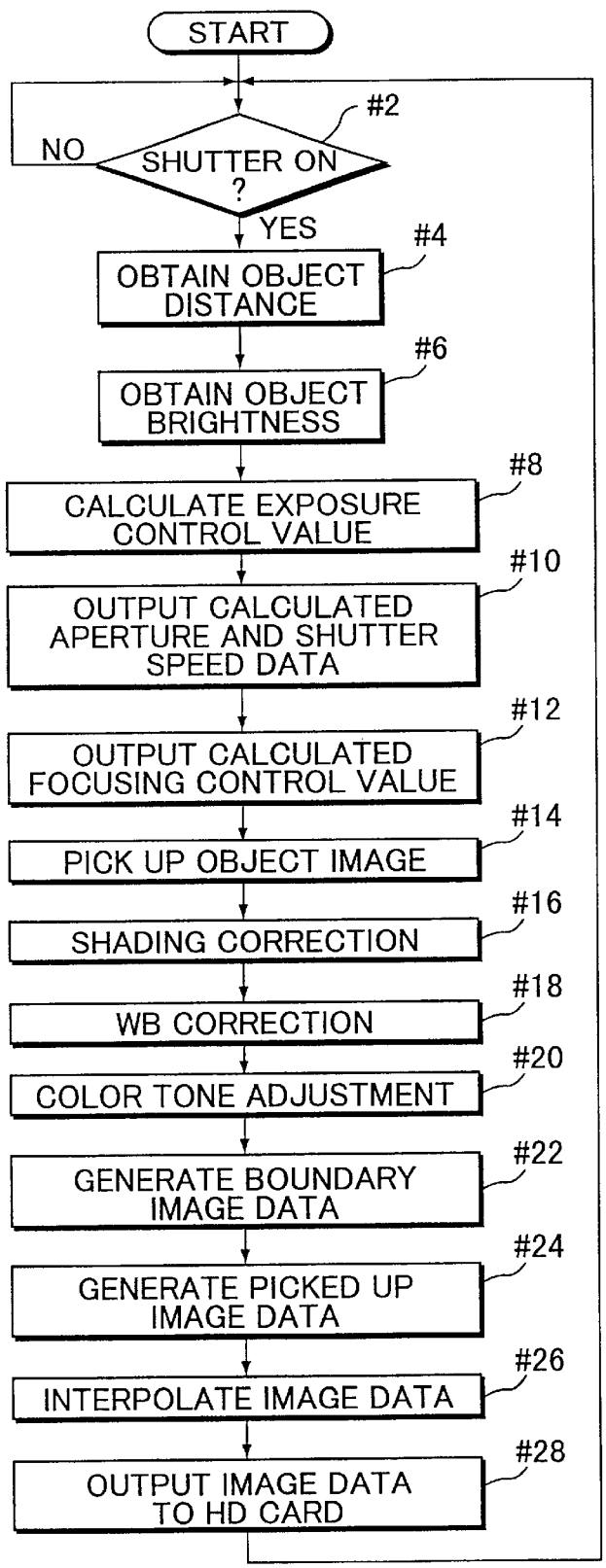
FIG. 16 is a flowchart showing a photographing control of the electronic camera.

Next, the photographing control of the electronic camera 1 is described with reference to a flow chart of FIG. 16.

When the electronic camera 1 is activated by turning the main switch on, it enters a photographing enabled state (loop of Step #2). When a photographer operates the shutter-release button 9 and a photographing command signal is inputted (YES in Step #2), an object distance data is obtained by the distance meter 20, and a focusing control value for the taking lens 20 is calculated based on the calculated object distance data (Step #4). Subsequently, an object brightness data is obtained by the light meter 21 (Step #6), and exposure control values (aperture value and shutter speed) are calculated using the calculated object brightness data (Step #8).

The calculated aperture value data is then outputted to the diaphragm drive controller 16 to adjust the aperture of the diaphragm 14, and the calculated shutter speed data is outputted to the CCD drive controller 17 (Step #10). Further, the calculated focusing control value is outputted to the lens drive controller 15 to perform focusing by moving the focusing lens of the taking lens 21 (Step #12).

Subsequently, the CCDs 12, 13 are driven for a predetermined time (integrate for a time corresponding to the shutter speed) to pick up an object image (Step #14). After specified signal processings are applied to the image signal representing the left and right images Q1, Q2 picked up by the CCDs 12, 13 for each of red, green and blue components, the image signal is stored in the image memory 183 after being converted into an image data by the A/D converter 182.

A shading correction is applied to the image data representing the left and right images Q1, Q2 stored in the image memory 183 for each of red, green and blue components in the shading corrector 184 using the predetermined shading correction table (Step #16). Subsequently, white balance adjustment is performed based on the WB gain outputted from the unillustrated WB sensor in the WB corrector 185 (Step #18), the color tones of the images in the boundary portions C are corrected by performing a predetermined correction calculation in accordance with any of the correction methods of the Color Tone Corrections 1 to 7 described above in the color tone corrector 186 (Step #20).

Subsequently, the image data of the boundary image Qc used for the image combination, in which density variation is inconspicuous in the boundary portion C, is generated According to the aforementioned boundary image generating method in the image combiner 187, using the left and right boundary images Qc1, Qc2 of the left and right images Q1, Q2 (Step #22). Further, the image data representing the picked image Q of the entire object is generated by combining the image data of the boundary image Qc, and the image data of the left and right images Q1, Q2 excluding the boundary images Qc1, Qc2 (Step #24).

The image data of the picked image Q is outputted to the HD card 10 via the output interface 189 to be stored therein (Step #28) after pixel data are supplemented in the empty pixel positions by the aforementioned interpolation in the image data interpolator 188. In this way, one image pickup operation is completed and this routine returns to Step #2 for the next one.

Although the object light image A is picked up by being divided into two partial images using the two CCDs in the foregoing embodiment, the present invention is also applicable to cases where the object light image A is picked up by being divided into three or more partial images using three or more CCDs.

Further, although the digital still camera is described in the foregoing embodiment, the present invention is also applicable to digital video cameras.

Figure 17:
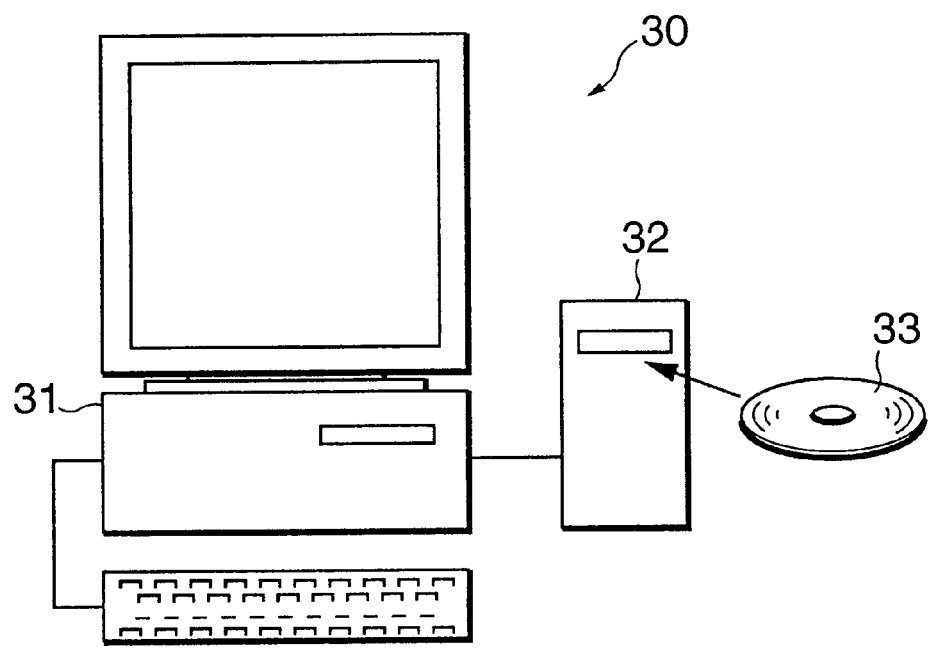
FIG. 17 is a diagram showing an image processor constructed by a computer system.

Furthermore, although the image processor is incorporated into the camera in the foregoing embodiment, the present invention is also applicable to an image processor constructed by a computer system or the like in which a plurality of picked images are pasted and combined together. In such a case, as shown in FIG. 17, an image correction program and an image combination program are stored in an external storage medium 33, which could be a magnetic storage medium such as a magnetic tape, or an optical storage medium such as a CD-ROM, an optical disk card or a photomagnetic disk, and are read by a computer main body 31 via an external storage driver 32 or transferred to the computer main body 31 via a network such as Internet. In this way, an image processor 30 can be constructed by a computer system.

As described above, an inventive image combination is adapted for pasting the first and second color images, which are each comprised of images of a plurality of color components and have images which partially overlap each other at the boundary portion, together at the boundary portion. For images of boundary portions of first and second color images, average values of pixel data of the boundary portions are calculated for each color component, the first and second offset amounts corresponding to the pixel data of at least one color component of the first and second color images are calculated using the average values, and the color tones of the first and second color images are corrected by adding the first offset amount to the pixel data of the corresponding color component of the first color image and adding the second offset amount to the pixel data of the corresponding color component of the second color image. Accordingly, even if there is a color discontinuity in the boundary portions of the first and second color images, this color discontinuity can be made inconspicuous during the image combination.

Particularly in the case that the first and second color images are each comprised of images of red, green and blue components, for images of red and blue components, the offset amounts are added to the pixel data of the boundary portions of the first and second color images to substantially match the frequency distribution function of the pixel data of the boundary portion of the first color image with that of the second color image. The offset amount is a difference between a center value which is a center of a first average value of the frequency distribution function of the pixel data of the boundary portion of the first color image and a second average value of that of the second color image and the first average value, or a difference between the center value and the second average value. Therefore, a color tone discontinuity in the boundary portions of the first and second can be suitably made inconspicuous.

Alternatively, in the first and second color images, the offset amounts, which are differences between the average value of the frequency distribution function of the pixel data of green component and the average values of the frequency distribution functions of the pixel data of red and blue components, are added to the pixel data of red and blue components so as to substantially match the average values of the frequency distribution functions of the pixel data of red and blue components with that of the frequency distribution function of the pixel data of green component. Therefore, a color discontinuity created in the boundary portions of the first and second color images can be made inconspicuous and the color tone deviation can also be corrected.

As this invention may be embodied in several forms without departing from the spirit of essential characteristics thereof, the present embodiment is therefore illustrative an not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. An image processor comprising:
   a calculator which calculates a first correction amount for pixel data of a first color image having a plurality of color components and a second correction amount for pixel data of a second color image having the same color components as the first color image, the first correction amount and the second correction amount being based at least in part on pixel data of at least a boundary portion of each of the first and second color images, and the first correction amount and the second correction amount being calculated for at least one of the color components;
   a corrector which corrects the pixel data of the first color image and the pixel data of the second color image based on the first and second correction amounts respectively to reduce a color tone difference between the first and second color images; and
   an image combiner which combines the corrected first color image with the corrected second color image at their respective boundary portions.

2. An image processor according to claim 1, wherein the first and second color images are images of an object which are obtained by an image pickup device.

3. An image processor according to claim 1, further comprising a white balance corrector which adjusts the white balance of the first and second color images, wherein the color tone corrector corrects the color tone of adjusted first and second color images.

4. An image pickup apparatus comprising:
   a first image sensor which picks up a first image of an object to produce a first color image having a plurality of color components;
   a second image sensor which picks up a second image of the object to produce a second color image having the same color components as the first image; and
   an image processor which processes the first and second color images, the image processor including:
      a calculator which calculates a first correction amount for pixel data of the first color image and a second correction amount for pixel data of the second color image for at least one of the plurality of color components, the first correction amount and the second correction amount being based on pixel data of at least a boundary portion of each of the first and second color images;
      a corrector which corrects the pixel data of the first color image and the pixel data of the second color image based on the first and second correction amounts respectively to reduce a color tone difference between the first and second color images; and
      an image combiner which combines the corrected first color image with the corrected second color image at their respective boundary portions.

5. An image pickup apparatus according to claim 4, further comprising a storage controller which allows the combined image to be stored in a storage medium.

6. A computer-readable storage medium storing a program comprising the steps of:
   calculating a first correction amount for pixel data of a first color image having a plurality of color components and a second correction amount for pixel data of a second color image having the same color components in the aspect of at least one of the plurality of color components based on pixel data of at least a boundary portion of each of the first and second color images in the aspect of the at least one color component;
   correcting the pixel data of the first color image and the pixel data of the second color image based on the first and second correction amounts respectively to reduce a color tone difference between the first and second color images; and
   combining the corrected first color image with the corrected second color image at their respective boundary portions.

* * * * *